(12) United States Patent
Griffith

(10) Patent No.: US 9,183,290 B2
(45) Date of Patent: *Nov. 10, 2015

(54) METHOD AND SYSTEM FOR DISAMBIGUATING INFORMATIONAL OBJECTS

(75) Inventor: Robert A. Griffith, Wallingford, PA (US)

(73) Assignee: Thomas Reuters Global Resources (CN)

( * ) Notice: Subject to any disclaimer, the term of this patent is extended or adjusted under 35 U.S.C. 154(b) by 148 days.

This patent is subject to a terminal disclaimer.

(21) Appl. No.: 13/118,390

(22) Filed: May 28, 2011

(65) Prior Publication Data

US 2011/0282890 A1    Nov. 17, 2011

Related U.S. Application Data

(63) Continuation-in-part of application No. 11/799,768, filed on May 2, 2007, now Pat. No. 7,953,724.

(51) Int. Cl.
*G06F 17/30* (2006.01)

(52) U.S. Cl.
CPC ...... *G06F 17/30728* (2013.01); *G06F 17/3064* (2013.01); *G06F 17/3071* (2013.01)

(58) Field of Classification Search
CPC .......... G06F 17/30728; G06F 17/3064; G06F 17/3071
USPC ......... 707/708, 726, 731, 737, 761, 770, 771; 705/344; 715/201; 725/42, 46, 52, 53
See application file for complete search history.

(56) References Cited

U.S. PATENT DOCUMENTS

| | | | |
|---|---|---|---|
| 5,237,503 A | 8/1993 | Bedecarrax et al. | |
| 6,154,213 A | 11/2000 | Rennison et al. | |
| 6,285,999 B1 | 9/2001 | Page | |
| 6,523,026 B1 | 2/2003 | Gillis | |
| 6,687,696 B2 | 2/2004 | Hofmann et al. | |
| 6,728,725 B2 | 4/2004 | Garfield et al. | 1/1 |
| 7,031,909 B2 | 4/2006 | Mao et al. | |

(Continued)

OTHER PUBLICATIONS

Dozier et al., automatic extraction and linking of person names in legal text, 2000, West Group, 17 pages.*

(Continued)

*Primary Examiner* — Jean B Fleurantin
(74) *Attorney, Agent, or Firm* — Valenti, Hanley & Robinson, PLLC; Kevin T. Duncan

(57) ABSTRACT

The present invention provides a Distinct Author Identification System ("DAIS") for disambiguating data to discern author entities and link or associate authorships with such author entities. The invention provides powerful disambiguation processes applied across one or more databases to yield a disambiguated authority database of authors. An entire database of publications may be processed by the DAIS to group/link authorships and to identify author entities. The author entities may then be matched or associated with actual authors to establish an authority database of authors. After initial evaluation, the DAIS may be used to reevaluate some or all of the database(s) and/or the authority database established by the DAIS may be used to add or update information. DAIS may use "hierarchical clustering" to link authorships and identify authors based on authorship similarity. DAIS evaluates the likelihood that authorships are from the same author.

30 Claims, 12 Drawing Sheets

(56) References Cited

U.S. PATENT DOCUMENTS

| | | | |
|---|---|---|---|
| 7,085,755 B2 * | 8/2006 | Bluhm et al. | 1/1 |
| 7,346,621 B2 * | 3/2008 | Zhang et al. | 707/802 |
| 7,529,735 B2 * | 5/2009 | Zhang et al. | 1/1 |
| 7,783,619 B2 | 8/2010 | McBeath et al. | 707/706 |
| 2006/0184481 A1 * | 8/2006 | Zhang et al. | 706/45 |
| 2006/0242121 A1 * | 10/2006 | DeVorchik et al. | 707/3 |
| 2006/0253418 A1 | 11/2006 | Charnock et al. | |
| 2007/0067285 A1 | 3/2007 | Blume et al. | |

OTHER PUBLICATIONS

Han et al., Name Disambiguating in Author Citations using a K-way Spectral Clustering Method, 2005, ACM, 334-343.*

Torvik, et al., A Prob. Similarity Metric for Medline Records: A Model for Author Name Disambiguation, Journ. of the Am. Soc. for Infor. Science and Tech., 56(2):140-158, 2005.

Bennett, Denise B. et al.—Name Authority Challenges for Indexing and Abstracting Databases, Evidence Based Library and Information Practice 2006, 1:1, pp. 37-57.

Borgatti, Stephen P.—How to Explain Hierarchical Clustering, Connections 17(2): 78-80, 1994 INSNA.

Dozier, Christopher et al.—Automatic Extraction and Linking of Person Names in Legal Text, Computer Science Research Dept., West Group, May 28, 2011, all page.

Garfield, Eugene—ABCs of Cluster Mapping. Part 1. Most Active Fields in the Life Sciences in 1978, Essays of an Information Scientist, vol. 4, pp. 634-641, Oct. 6, 1980.

Garfield, Eugene—ABCs of Cluster Mapping. Part 2. Most Active Fields in the Physical Sciences in 1978, Essays of an Information Scientist, vol. 4, pp. 642-649, Oct. 13, 1980.

Garfield, Eugene—Towards Scientography, Essays of an Information Scientist, vol. 9, pp. 324-335, The Geography of Science: Disciplinary and National Mapping, Oct. 27, 1986.

Garfield, Eugene et al.—HistCite: A Software Tool for Informetric Analysis of Citation Linkage, vol. 57(2006)8, pp. 391-400.

Han, Hui et al.—Name Disambiguation in Author Citations using a K-way Spectral Clustering Method, JCDL '05, Jun. 7-11, 2005, Denver, CO.

Mapping the Structure of Science, Citation Indexing, Chapter Eight, pp. 98-147, Nov. 28, 2011.

Dozier et al, Mining Text for Expert Witnesses, May-Jun. 2005, IEEE, vol. 22, 94-100.

C Dozier et al, Cross-document Co-Reference Resolution Applications for People in the Legal Domain, 2004, Google, 8 pages.

* cited by examiner

Case 1: Find works by an author

Case 2: Find other works by an author of interest

METHOD AND SYSTEM FOR DISAMBIGUATING INFORMATIONAL OBJECTS

RELATED APPLICATIONS

The present application is a continuation in part of prior U.S. application Ser. No. 11/799,768, filed May 2, 2007, now U.S. Pat. No. 7,953,724 which is incorporated herein by reference in its entirety.

FIELD OF THE INVENTION

The field of the invention relates generally to information science and infometrics (or informetrics) and more particularly to the fields of bibliometrics and scientometrics and clustering of information using linking techniques to establish relationships between objects.

BACKGROUND OF THE INVENTION

With the advents of the printing press, typeset, typewriting machines, and computer-implemented word processing and storage, the amount of information generated by mankind has risen dramatically and with an ever quickening pace. As a result there is a continuing and growing need to collect and store, identify, track, classify and catalogue for retrieval and distribution this growing sea of information and an entire area of study has emerged called "information science." One popular existing form of cataloging and classifying information, e.g., books and other writings, is the Dewey Decimal System. Beyond classifying information, information science involves the study of how organizations and people, e.g., researchers, interact in moving bodies of science and research forward.

In the area of scholarly and scientific writing a sophisticated process and convention for documenting research, supporting materials and organizing fields of study has emerged called "bibliographic citation." Such scientific writings include, among other things, books, articles published in journals, magazines or other periodicals, and papers presented, submitted and published by society, industry and professional organizations such as in proceedings and transactions publications. To facilitate the widespread distribution of information published in scholarly writings to more efficiently and effectively move bodies of study forward, scholars and scientists use bibliographic citation to recognize the prior work of others, or even themselves, on which advancements set forth in their writings are based. "Citations" included in any particular work or body of work collectively form a "bibliography" and are used to identify sources of information relied on or considered by the author and to give the reader a way to confirm accuracy of the content and direction for further study. A "bibliography" may refer to either of a complete or selective list or compilation of writings specific to an author, publisher or given subject, or it may refer to a list or compilation of writings relied on or considered by an author in preparing a particular work, such as a paper, article, book or other informational object.

Citations briefly describe and identify each cited writing as a source of information or reference to an authority. Citations and bibliographies follow particular formatting conventions to enhance consistency in interpreting the information. Each citation typically includes the following information: full title, author name(s), publication data, including publisher identity, volume, edition and other data, and date and location of publication. However, the author names are most usually in an abbreviated form, such as an initial rather than full first or middle names (e.g., J. Smith), or suffer naturally from commonality with other authors, such as having either a common first or last name or both e.g., John Smith. This is results in a latent ambiguity as to the actual identity of the author. There have been many attempts to disambiguate author information, i.e., to establish a single semantic interpretation for, in this case, author identity. Each writing or paper may have one or more authors and represents an authorship for each author or co-author. As used herein each authorship instance represents the contribution of an individual author. Accordingly, if a paper has three co-authors then there will be three distinct "authorships" associated with that paper. For purposes of descriptions contained herein, for a paper identified as "1" having co-authors A, B, and C, then the authorships associated, respectively, with the co-authors would be identified as A1, B1, and C1. for linking authorships or citations representing authorships with particular authors and bibliographies of given authors.

Two areas of scientific study directed to measuring and analyzing science and scientific publications are "scientometrics" and "bibliometrics," which are based on the early works of Vannevar Bush and more recently on the works of, among others, Eugene Garfield, founder of the Institute for Scientific Information Bibliometrics concerns analyzing content and associated information of books and other publications, which may be referred to as informational objects. Such analysis may then be used to identify and/or quantify, confirm or reject relationships among informational objects, e.g., author entities, or academic journal citations, to create links among the informational objects. Other applications for bibliometrics include: creating word relationships to populate a thesaurus; measuring frequency of terms (individual words, groups of words, or word roots or meanings); identifying relationships of texts using grammar, semantic and syntax rules, and other techniques to create useful tools and resources.

Efforts have been undertaken to define relationships and the evolution of science within particular fields to give some coherent structure to the business of science, for example, see Eugene Garfield, Mapping The Structure Of Science (Chapter 8), Citation Indexing: Its Theory and Application in Science, Technology, and Humanities, John Wiley & Sons, Inc. NY, p. 98-147, 1979; and The Geography Of Science: Disciplinary And National Mappings, by Henry Small and Eugene Garfield, J. Inform. Sci., 11:147-159 (1985). ISI's Science Citation Index ("SCI") was created as a citation index of the world's leading journals of science and technology and has proven to be a powerful bibliometric resource. SCI has been used to map the progress and development of science by using factors that measure the importance of scientific journals. The study of science based on examining citations and bibliographies to infer associations may be referred to as "citation analysis." For instance, SCI has been used to show that certain fundamental journals are central to hard science while in areas such as the humanities or social sciences there is no such relationship.

In support of the pursuits of science and research databases, database management tools, citation management and analysis tools, research authoring tools, and other powerful tools and resources have been used and developed for the beneficial use of researchers and scientists. These tools and resources may be available to users in an online environment, over the Internet or some other computer network, and may be in the form of a client-server architecture, central and/or local database, application service provider (ASP), or other environment for effectively communicating and accessing electronic databases and software tools. Examples of such tools and resources are Thomson Scientific's Web of Science™ (WoS), Web of Knowledge™ (WoK), and Researchsoft™ suite of publishing solutions including, EndNote™, EndNoteWeb™, ProCite™, Reference Manager™, and RefViz™, as well as solutions such as Scholar One's Manuscript Central™ A longstanding problem associated with these databases and tools has been inaccurate identification and attribution of authorship due to, among other things, author name ambiguity which may be a result of incomplete information (e.g., abbreviated name with initials), incorrect information (e.g., misspellings), and common/identical information (e.g., same name same spelling). Name ambiguity resulting in incorrect linkage of paper and citation records with author entities result in inaccuracies that diminish integrity, reliability and performance of resources and tools, including document and information search and retrieval, database integration, and research formation.

Techniques used to help build out databases and confirm database information include extraction and sorting, such as parsing of data from sentence or word structures, performed on electronic documents to extract information from papers and citations for further processing. Prior extraction techniques may include linking techniques such as Bayesian-based techniques as described in Automatic Extraction And Linking Of Person Names In Legal Text, Christopher Dozier and Robert Haschart, In Proceedings of RIAO 2000 (Recherche d'Information Assistee par Ordinateur), 12-14 Apr. 2000, Paris, France, pp. 1305-1321. See also HistCite™: A Software Tool for Informetric Analysis of Citation Linkage, Eugene Garfield, Soren Paris, and Wolfgang Stock, Information Wissenschaft & Praxis, 57(8):391-400, November/December 2006.

Relational links may be established based on "citations" and such links may be used in searching for materials and analyzing the relative merit of resources. By linking informational objects, such as papers, through citations and citation indices, e.g., WoS, users can search forward using a known article to identify and access more recent publications that cite the known article and are related to the same subject matter.

Citation analysis can applied across databases such as WoS and WoK to determine acceptance, following, and impact of specific publications and authors and may be used, for example, in screening reference materials, validating research, establishing interaction among authors or institutions, and in deliberating an author's tenure review. Although citation analysis has been used for years, ever increasing computing power and information management techniques are making it more useful and widespread. One highly beneficial use of citation analysis is to associate works of authorship with individual authors. Also, integrating new publications into an existing database of papers and other works often starts with an existing list of known authors as a starting point. For example, assume an existing list of authors includes an entry for John Smith, Professor at University of Alabama. And then assume a subsequent article indicating "J. Smith" from "U. of Al." as an author or co-author. Known systems might automatically associate the article with the known John Smith at University of Alabama that appears on the existing list of authors. However, the system would not know of or consider the case of a "Jane Smith" that recently became professor at University of Alabama. Also, such a system might not have a way of detecting a miss-match or the likelihood of a miss-match, e.g., if the citation has an incorrect abbreviation either in the author name or in the school/institution name, e.g., typographical error in that the school should have been "U. of Az." for University of Arizona at which the real author, Jeff Smith, is a professor.

Writings" and "papers," as used herein shall refer to both "hard" and "soft" electronic documents, are now widely created, edited, maintained, archived, catalogued and researched in whole or in part electronically. The Internet and other networks and intranets facilitate electronic distribution of and access to such information. The advent of databases, database management systems and search languages and in particular relational databases, e.g., DB2 and others developed by IBM, Oracle, Sybase, Microsoft and others, has provided powerful research and development tools and environments in which to further advance all areas of science and the study of science. There are companies and institutions that have created electronic databases and associated services, such as SCI, WoS, and WoK, that are specifically designed to help organize and harness the vast array of knowledge.

Clustering" is a method of identifying a subset of items sufficiently similar to form a relational link to form a "cluster." A dendrogram is a graphical representation of links between data objects forming a cluster tree. If the linking of the data objects grows weaker the farther up the cluster tree, then one could assign a threshold degree of relatedness such that the tree is severed at some level resulting in individual groups of connected or linked data objects forming a plurality of clusters of data objects. There are several known techniques for clustering data objects, including single link, average link, complete link For instance, in a database of articles including: Article 1 with author "J. Smith at Univ. of Ala."; Article 2 with co-author "Jeff Smith at Univ. of Al."; and Article 3 with co-author "J. S. Smith at Univ. of Alabama," a sufficient link may have been formed based off of the name similarity and the school similarity to form a cluster as representing author "Jeff S. Smith" of the University of Alabama. This may be in conjunction with a known list of authors or professors including a "Jeff Smith" at the University of Alabama. Because papers often do not include full names, because professors do change positions and schools, and because typographical errors do occur, relying heavily on last name and first initial could introduce significant risk for error in the database and bibliographies generated by using such databases and systems. What is needed is a way to more accurately link or associate authorships with individual authors.

SUMMARY OF THE INVENTION

The present invention provides a method and system, Distinct Author Identification System ("DAIS"), for analyzing citations of papers and the like and comparing citation information by applying a powerful technique for linking and clustering authorships to disambiguate author information to form an author entity cluster representing an actual person, such as a scientific researcher and author. For instance, the inventive disambiguation processes disclosed herein may be used against a database comprised of over a hundred years of scientific papers. Such papers typically only include first and perhaps middle name initials and the last name of authors. Even in the case of full names, names are usually not unique to one person. The present invention provides a powerful way to extract useful information from the papers in the database, disambiguate author data, cluster authorships into author entities, and associate a unique code for each such entity to establish an authority database of authors to assist further research and other endeavors.

Known methods of associating records or documents with informational objects used metadata record but did not use the cited reference information. Some of these systems use an "author list" as a starting point and attempt to associate publications with authors on the list using the author information provided on the publication. However, name ambiguity makes this an uncertain proposition and mistakes existing in the database only compound the error when associating newly added publications. One constant problem facing those interested in accurately identifying and associating scholarly works has been that author names appearing in citations and in references themselves do not necessarily, or even sufficiently, uniquely identify the author data with an actual entity. Moreover, in the areas of research and science authors typically contribute to many publications and often with different sets of co-authors, it is difficult to with a high degree of confidence, much less absolute certainty, associate publications with particular authors. In other words there is inherent ambiguity in the process of extracting information, such as author data, from a reference or citation and associating such extracted information with a known or assigned source, e.g., an author entity or cluster entity and from there with an actual person. The present invention provides novel techniques to extract information selected to yield a high degree of relational linking and to apply novel techniques against such extracted information to yield highly accurate relationally linked clusters to disambiguate records across one or more databases, e.g., WoS and WoK.

One approach the present invention DAIS takes is to identify and extract information considered to be more reliable than incomplete author information and to draw associations not solely with author data but with other data to establish a more accurate relational link. For instance, where a paper includes an email address, this has been determined to be a more reliable piece of information on which to draw relationships and linking of clusters. Rather than associate the email address with an "author", the present invention creates an "author entity" or "cluster entity" and assigns such an entity a unique author or cluster code. In addition, where a company or university name is included in and extracted from the document, the DAIS associates the company or university data with the paper or publication rather than the "author." In a separate action the DAIS associates or links the unique author code with an actual person/author. After associating the author or cluster entity code with an actual author, the process establishes an "authority database of authors" for operational use.

Once the novel DAIS linking techniques have been applied across the target databases, then the disambiguated author tables from the authority database of authors may be used to more accurately classify and associate subsequently added publications and records to more effectively integrate such information into the operational database for use by researchers, this may be referred to as an. This subsequent integration may be used in conjunction with known linking techniques, e.g., Bayesian rules. Also, the disambiguation process may be subsequently performed on a subset of records. For example based on an event, such as a threshold number of new references identifying "J. Smith" as an author added to the database, the content management system may use the DAIS process to reevaluate the records associated with all "Smith, J" clusters or it may add an additional cluster for a newly identified author entity or cluster.

One use of the invention is to provide an improved method and system for more accurately linking works of authorship with actual authors. Another use is to disambiguate a universe of papers contained in a database using citation information to identify a universe of author entities each having one or more authorships attributed thereto. Another use of the invention is to link or associate authorships with one or more author entities. In accordance with another exemplary embodiment the invention may allow or require an author to register with a system or operator to prevent ambiguous author issues. In accordance with an exemplary embodiment the invention provides a method or system whereby authors may recognize that not all of their works of authorship are attributed to them or are divided among more than one cluster or author entity by the DAIS and then as presented by and through the WoS or other database. The author may issue a signal, such as by acting on links or buttons provided via a browser, to the CMS or other system or vice versa to notify or inquire to the author. The CMS then receives the request from the author or perhaps a reviewer or administrator indicating that an author is associated with more than one cluster. In this process, the CMS or other system may send to the author or to an administrator a request signal requesting a set of information. The CMS may then receive a response to the request signal and based on the response take some appropriate action. For instance the CMS may associate the response with the author such that the author becomes associated with a single cluster or some reference is then associated with the author's cluster/author identifier or code.

In another exemplary embodiment the present invention provides a computer implemented method for disambiguating data associated with a set of information. The method comprises the following: selecting a set of electronic information associated with a plurality of publications having one or more authorships; disambiguating, using computer implemented processes, at least some of the set of electronic information based on select data elements, the select data elements comprising at least one of the following: email address; co-citation; bibliographic coupling; self cite; and co-author, the disambiguating step comprising: determining an authorship similarity between publication authorships by processing the select data elements; and linking authorships based on the determined authorship similarity. In addition, this embodiment may include clustering two or more linked authorships to form a first cluster and forming a first author entity associated with the first cluster; and matching the first author entity with a first actual author, the first cluster of authorships being attributable to the first actual author, and wherein the clustering step is repeated to form a plurality of clusters associated with a plurality of unique author entities.

The invention may include establishing an authority database of authors comprising the plurality of unique author entities each associated with a unique actual author and a cluster. The invention may further include establishing a communication link with a client; providing the client with a graphical user interface to query against the authority database of authors; and processing the query terms submitted by the client and presenting the client with disambiguated data. The invention may further include receiving notice of an erroneous match of an actual author with at least one of an authorship, a cluster, or an author entity, and based on the notice disassociating the actual author from the at least one of an authorship, a cluster, or an author entity. Further, the determining step may include arriving at a scored authorship similarity attribute and the linking step may be based on the scored authorship similarity attribute meeting or exceeding a predetermined degree of similarity. The scored authorship similarity attribute is based at least in part on author name data, a commonality of the name data, a frequency of occurrence of the name data, and/or on co-authorship data comprising the number of authorships associated with publications, wherein as the number of co-authorships increases, the degree of similarity associated with the co-authorship data decreases.

Where the co-authorship data comprises co-author name data and matching co-author name data among publications increases the scored authorship similarity attribute. Further, the determining step may result in an authorship similarity insufficient to form a link in the linking step, and the linking step may further comprise processing information derived from the set of electronic information to establish a secondary link between authorships. The invention may further comprise reevaluating at least a portion of the established authority database of authors based on supplemental information, and this may be based at least in part on the supplemental information including data representing a threshold number of publications having common author name data. The select data elements may further comprise at least one of the following elements: address; cited reference paper; cited reference author name; cited by paper; cited by author name; keywords; Publication Discipline Code; and additional author name initial.

In one embodiment the invention provides a computer-implemented method comprising: receiving a set of electronic information associated with a set of publications, each publication in the set of publications comprising at least one cited reference and having at least one authorship; comparing at least a portion of the set of electronic information with authorship data contained in an authority database, the authorship data related to authorship entities represented in the authority database; and associating the set of electronic information with one or more authorship entities. Further, the invention may include linking the at least one authorship to the one or more authorship entities based on determining an authorship similarity between the at least one authorship and the one or more authorship entities. Each authorship entity may be associated with a cluster of authorships and the method may also include adding the authorship to the authority database and associating it with at least one cluster of authorships stored in the authority database.

In keeping, with the DAIS process, the authorship entities may have been previously defined at least in part using a disambiguation process, such as described hereinbelow, and previously stored in the authority database. The set of electronic information may be received subsequent to the disambiguation and storing process with the authorship being linked to a previously defined cluster of authorships. The process may further include: receiving a manual input confirming the linking of the at least one authorship with the previously defined cluster of authorships, and/or receiving a manual input for confirming an association of an authorship with an authorship entity. The association process may include receiving a manual input concerning associating the set of electronic information with the one or more authorship entities. An additional feature of the process may be sending an electronic communication to an email address associated with an authorship entity. For example, a researcher or other user/author having an author profile stored on the database may have an email address also stored at the authority database, on a client side management system, or other system. The DAIS process may automatically generate and send an email to the known author (or related user—e.g., publisher, editor) to confirm or verify authorship information. This may include confirming a set of publications (related authorships) that form a cluster around the unique author identifier associated with that known author. The electronic communication may include a link to enable inputting of a signal confirming an association of an authorship with an authorship entity stored in the authority database. The electronic communication may indicate a potential match of an authorship with an authorship entity stored in the authority database. The process may also include storing the set of electronic information in the authority database; receiving a query related to the one or more authorship entities; presenting authorship data in response to the query; receiving a signal confirming author entity data stored at the authority database. In this manner the DAIS system may maintain an author profile record associated with a unique author identifier and a cluster of authorships associated with the author identifier.

The invention may also include: providing a secure account for electronically accessing data associated with a unique author identifier; upon secure account access, presenting author entity data associated with the unique author identifier stored at the authority database in response to receiving a request for information; linking at least one additional authorship to an existing cluster of authorships associated with the unique author identifier in response to a received input associated with the unique author identifier; and storing data representing the linking in an authority database of authors. In keeping with the invention, the authority database of authors may include a plurality of unique author entity records each associated with a unique actual author and a cluster.

In another embodiment the invention provides a computer-implemented method comprising: presenting data representing a set of publications to a user; providing a user interface for allowing a user to input a selection related to authorship of one or more of the set of publications; and updating an authority database to reflect an association of a unique author with the selection related to authorship of one or more of the set of publications. The invention may further include: prior to updating the authority database, verifying the association of the unique author with the selected one or more of the set of publications based at least in part on an authorship similarity between data associated with the unique author and a set of one or more authorship entities; receiving a query from a user and presenting the data representing a set of publications in response to the query; generating an electronic message addressed to an electronic mail address associated with the unique author. The invention may further include presenting a notice of a possible erroneous match of a unique author with at least one authorship and, based on a response to the notice, doing one of associating and disassociating the unique author from at least one of an authorship, a cluster, or an author entity. The invention may be further characterized as follows: wherein prior to presenting, disambiguating authorship data related to the set of publications; wherein disambiguating includes scoring an authorship similarity attribute; wherein the scored authorship similarity attribute is based at least in part on co-authorship data comprising the number of authorships associated with publications, wherein as the number of co-authorships increases, the degree of similarity associated with the co-authorship data decreases; wherein disambiguating comprises processing at least one of the following elements: email address; co-author data; address data; paper title; cited reference author name; cited by paper; cited by author name; keywords; Publication Discipline Code; co-citation; bibliographic coupling; self cite; and author name initial data.

In another embodiment, the invention provides a computer-based system comprising: a computer adapted to process a set of electronic information associated with a set of publications, each publication in the set of publications comprising at least one cited reference and having at least one authorship; software executing on the computer and adapted to: receive a set of electronic information associated with a set of publications; compare at least a portion of the set of electronic information with authorship data contained in an authority database, the authorship data related to authorship entities represented in the authority database; and associate the set of electronic information with one or more authorship entities. The invention may include software further adapted to: link the at least one authorship to the one or more authorship entities based on determining an authorship similarity between the at least one authorship and the one or more authorship entities.

In yet a further embodiment, the invention provides a computer implemented method for maintaining an authority database of authors, the method comprising: receiving from a user data representing a user-defined set of publications each having at least one authorship and related to a unique author; recognizing the received data as being associated with a researcher identifier; using an authority database, verifying the received data to render a threshold confirmation of correctness in association of the set of publications with the unique author; doing one or the other of 1) matching the unique author with an existing unique author profile record stored by the authority database; or 2) creating a new unique author profile record and storing the new unique author profile record by the authority database. The invention may be further characterized as follows: wherein the existing unique author profile record includes a cluster of a set of authorships of a set of publications attributed to a unique author represented by the unique author profile record; wherein the unique author profile record resulted from: receiving publications, each publication containing at least one cited reference and having at least one authorship; and disambiguating the received publications by comparing the at least one cited references with data associated with the authority database of authors to determine an authorship similarity between publication authorships; wherein disambiguating includes: scoring an authorship similarity; and linking authorships based on the determined authorship similarity and clustering two or more linked authorships to form a first cluster and forming a first author entity associated with the first cluster; wherein disambiguating includes: matching the first author entity with a first actual author, the first cluster of authorships being attributable to the first actual author, and repeating the clustering step to form a plurality of clusters respectively associated with a plurality of unique author entities; and incorporating into the authority database of authors the plurality of unique author entities each associated with a unique actual author and a cluster.

In another embodiment, the invention provides a computer-based system comprising: a computer adapted to process a set of electronic information associated with a set of publications, each publication in the set of publications comprising at least one cited reference and having at least one authorship; software executing on the computer and adapted to: receive from a user data representing a user-defined set of publications each having at least one authorship and related to a unique author; recognize the received data as being associated with a researcher identifier; accessing an authority database and verifying the received data to render a threshold confirmation of correctness in association of the set of publications with the unique author; process the received data to do one or the other of 1) match the unique author with an existing unique author profile record stored by the authority database; or 2) create a new unique author profile record and storing the new unique author profile record by the authority database. The invention may be further characterized as follows: wherein the existing unique author profile record includes a cluster of a set of authorships of a set of publications attributed to a unique author represented by the unique author profile record; wherein the unique author profile record resulted from: receiving publications, each publication containing at least one cited reference and having at least one authorship; and disambiguating the received publications by comparing the at least one cited references with data associated with the authority database of authors to determine an authorship similarity between publication authorships; wherein disambiguating includes: scoring an authorship similarity; and linking authorships based on the determined authorship similarity and clustering two or more linked authorships to form a first cluster and forming a first author entity associated with the first cluster; wherein disambiguating includes: matching the first author entity with a first actual author, the first cluster of authorships being attributable to the first actual author, and repeating the clustering step to form a plurality of clusters respectively associated with a plurality of unique author entities; and incorporating into the authority database of authors the plurality of unique author entities each associated with a unique actual author and a cluster.

In yet another embodiment, the present invention provides a content management system in communication with one or more publications databases, each comprising a plurality of publications, and with a plurality of remote users, the content management system comprising: a disambiguation computer; a disambiguation database; an authorship similarity routine; and a clustering routine. The disambiguation database is operatively connected to the disambiguation computer and adapted to receive and store for processing by the disambiguation computer at least a first set of information derived from one or more publications databases, the first set of information including data elements derived from a plurality of publications having one or more authorships. The authorship similarity routine executes on the disambiguation computer and processes at least some of the first set of electronic information based on select data elements to compare the select data elements to determine a degree of authorship similarity, the select data elements comprising at least one of the following elements: email address; co-citation; bibliographic coupling; self cite; and co-author. The linking routine executes on the disambiguation computer and links authorships based on the degree of authorship similarity. The clustering routine executes on the disambiguation computer to cluster two or more linked authorships to form a first cluster and adapted to form a first author entity associated with the first cluster, whereby the clustering routine is executed to produce an authority database of authors operatively stored on the disambiguation database and comprised of a plurality of unique author entities each associated with a unique actual author and a cluster. A plurality of remote users may each access the authority database of authors using a client-based computer and submit queries against the authority database of authors, whereby the query terms are processed and the client is presented with disambiguated data. The remote users using client-based computers in conjunction with a research productivity software may access and query the disambiguation database and publications databases to develop bibliographic data records.

BRIEF DESCRIPTION OF THE DRAWING

In order to facilitate a full understanding of the present invention, reference is now made to the accompanying drawings, in which like elements are referenced with like numerals. These drawings should not be construed as limiting the present invention, but are intended to be exemplary and for reference.

Figures 7, 8:
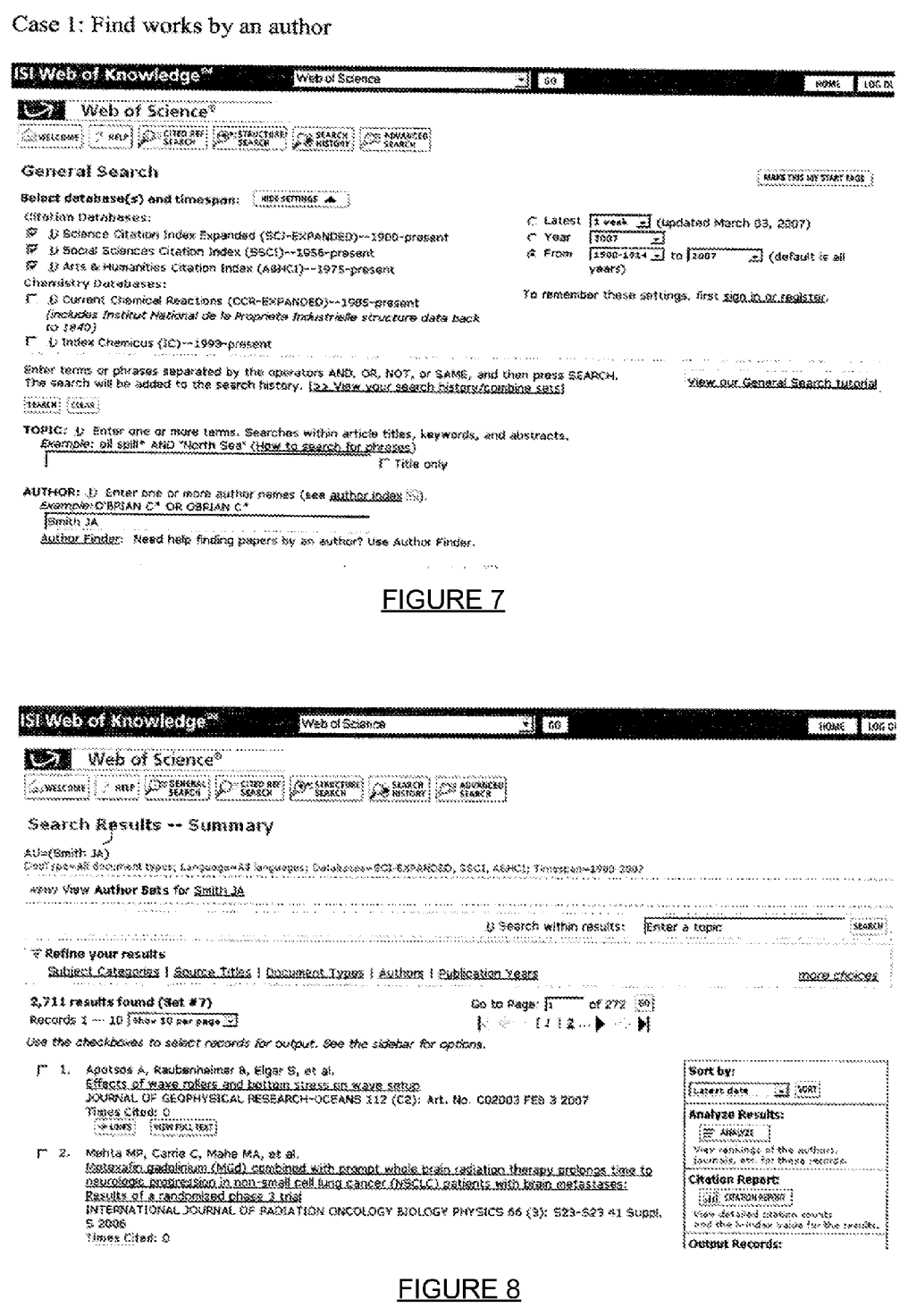

FIG. 7 is a screen shot illustrating a graphical user interface by which a user may access information disambiguated using the author disambiguation linking techniques associated with the present invention.

FIG. 8 is a screen shot illustrating a graphical user interface by which a user may access information disambiguated using the author disambiguation linking techniques associated with the present invention.

FIG. 9 is a screen shot illustrating a graphical user interface by which a user may access information disambiguated using the author disambiguation linking techniques associated with the present invention.

FIG. 10 is a screen shot illustrating a graphical user interface by which a user may access information disambiguated using the author disambiguation linking techniques associated with the present invention.

Figures 11, 12:
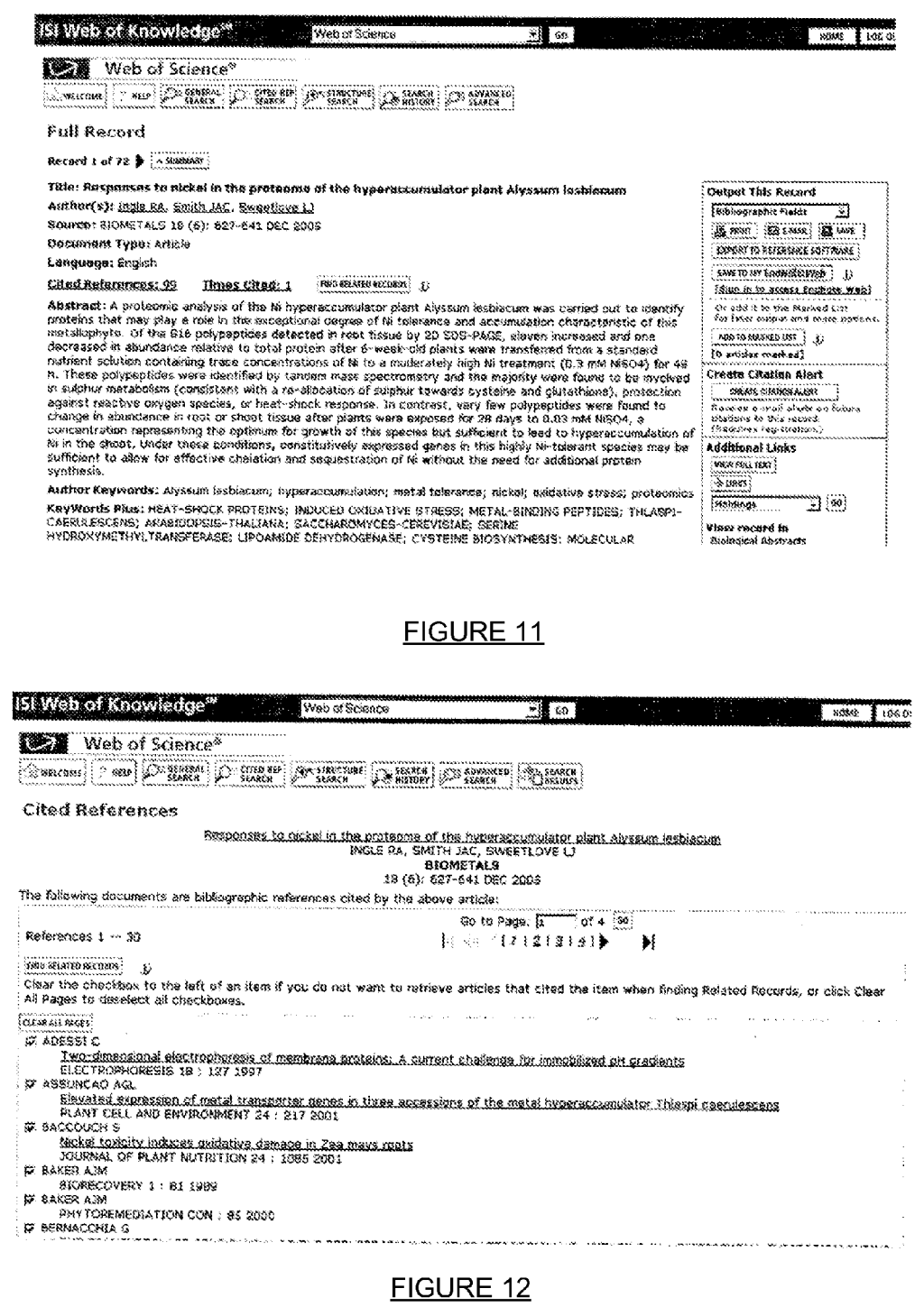

FIG. 11 is a screen shot illustrating a graphical user interface by which a user may access information disambiguated using the author disambiguation linking techniques associated with the present invention.

FIG. 12 is a screen shot illustrating a graphical user interface by which a user may access information disambiguated using the author disambiguation linking techniques associated with the present invention.

Figures 15, 16:
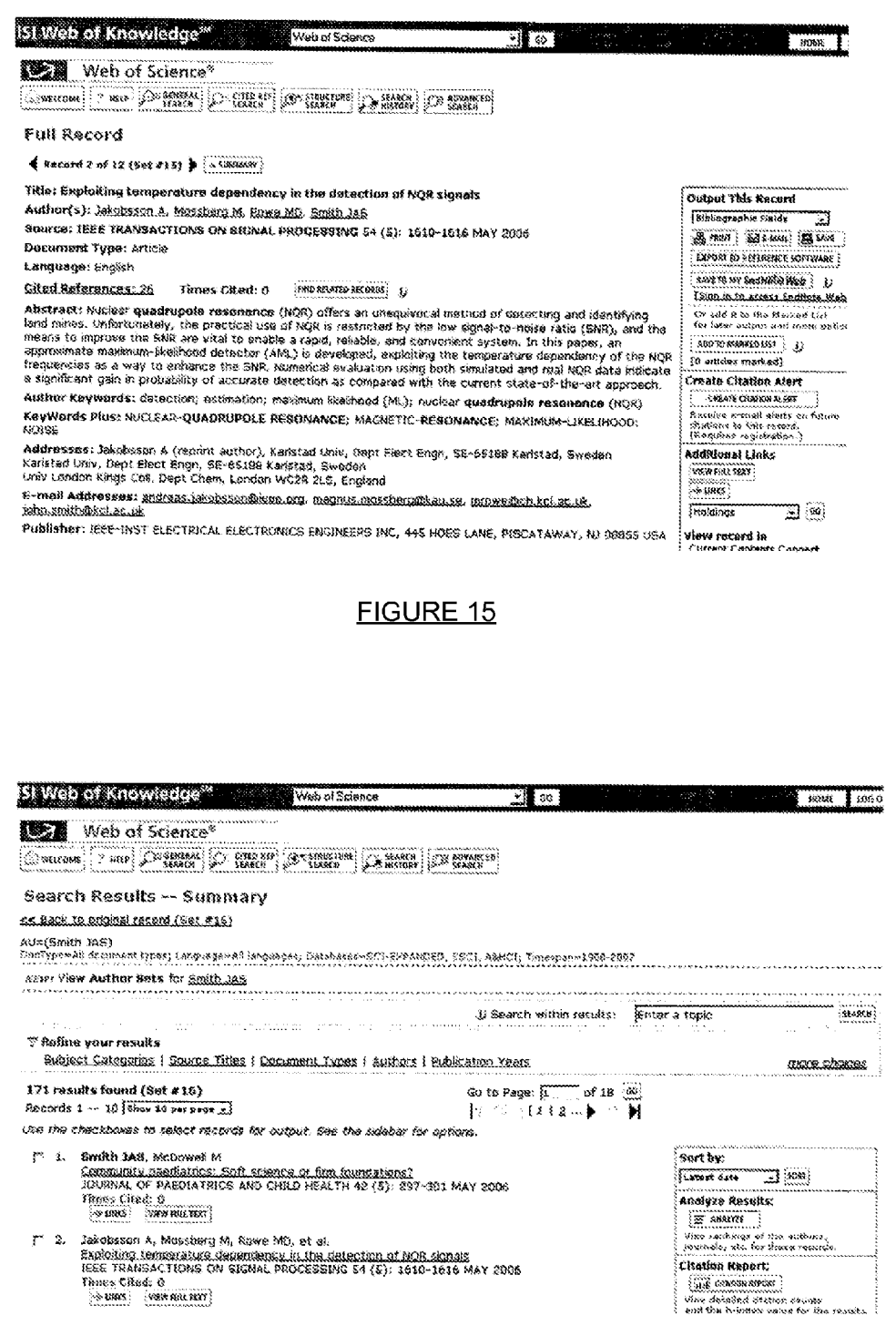

FIG. 15 is a screen shot illustrating a graphical user interface by which a user may access information disambiguated using the author disambiguation linking techniques associated with the present invention.

FIG. 16 is a screen shot illustrating a graphical user interface by which a user may access information disambiguated using the author disambiguation linking techniques associated with the present invention.

Figure 17:
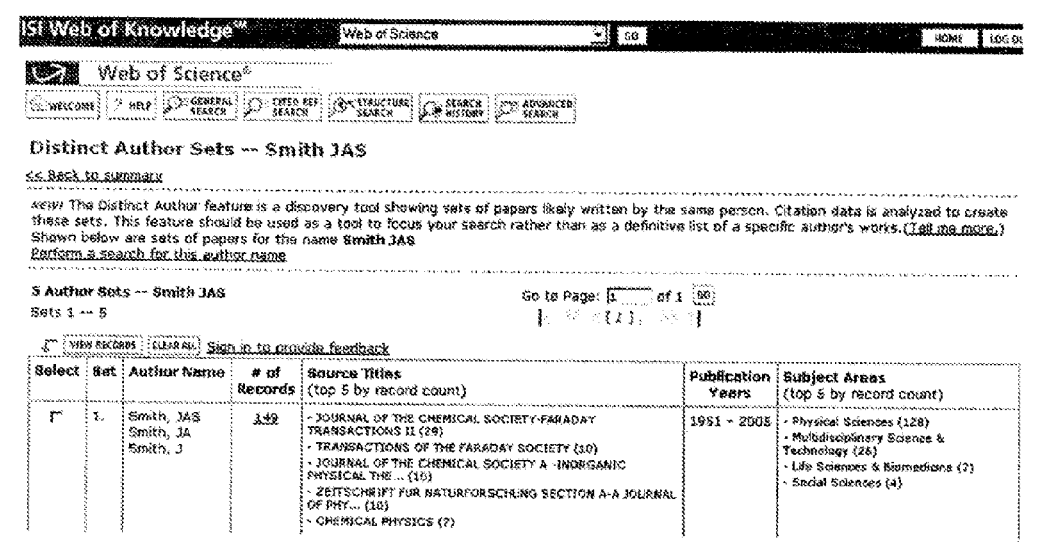

FIG. 17 is a screen shot illustrating a graphical user interface by which a user may access information disambiguated using the author disambiguation linking techniques associated with the present invention.

DETAILED DESCRIPTION OF THE INVENTION

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

As described herein, the term "item" and the terms "writing", "paper", and "article" shall be understood to refer to documents, papers, writings, and other publications, including pre-publications, and are all meant to each inherently refer to the other terms as the invention is intended to cover all sorts of publications, paper, writings articles in journals; letters or editorials; books; chapters in books; or other kinds of published papers or document. This is intended to globally cover hard documents as well as soft documents. An item that is part of a collection in a database, CMS or other resource described herein. Capture and index bibliographic information may be more particularly referred to as a "source item". Part of the information captured, for instance in extracting information from an item, is the item's bibliography of cited references. Items in such bibliographies may be referred to as "reference items". Some reference items may be items captured as a source item but not necessarily. To get data to build the DAIS database, the description refers to the WoS database and the techniques described herein support the WoS service. However, this is only exemplary and intended to help illustrate the invention and is not meant to be limiting.

The field "ut" is an unique identifier for source items. This field is not only used by the WoS database but other of our databases as well. On the other hand "record id" (in any of the variant forms listed herein) is a reference to the WoS database. WoS takes the union of the set of all source items and the set of all reference items and gives each of these unique items an identifier called record id.

Figure 1:
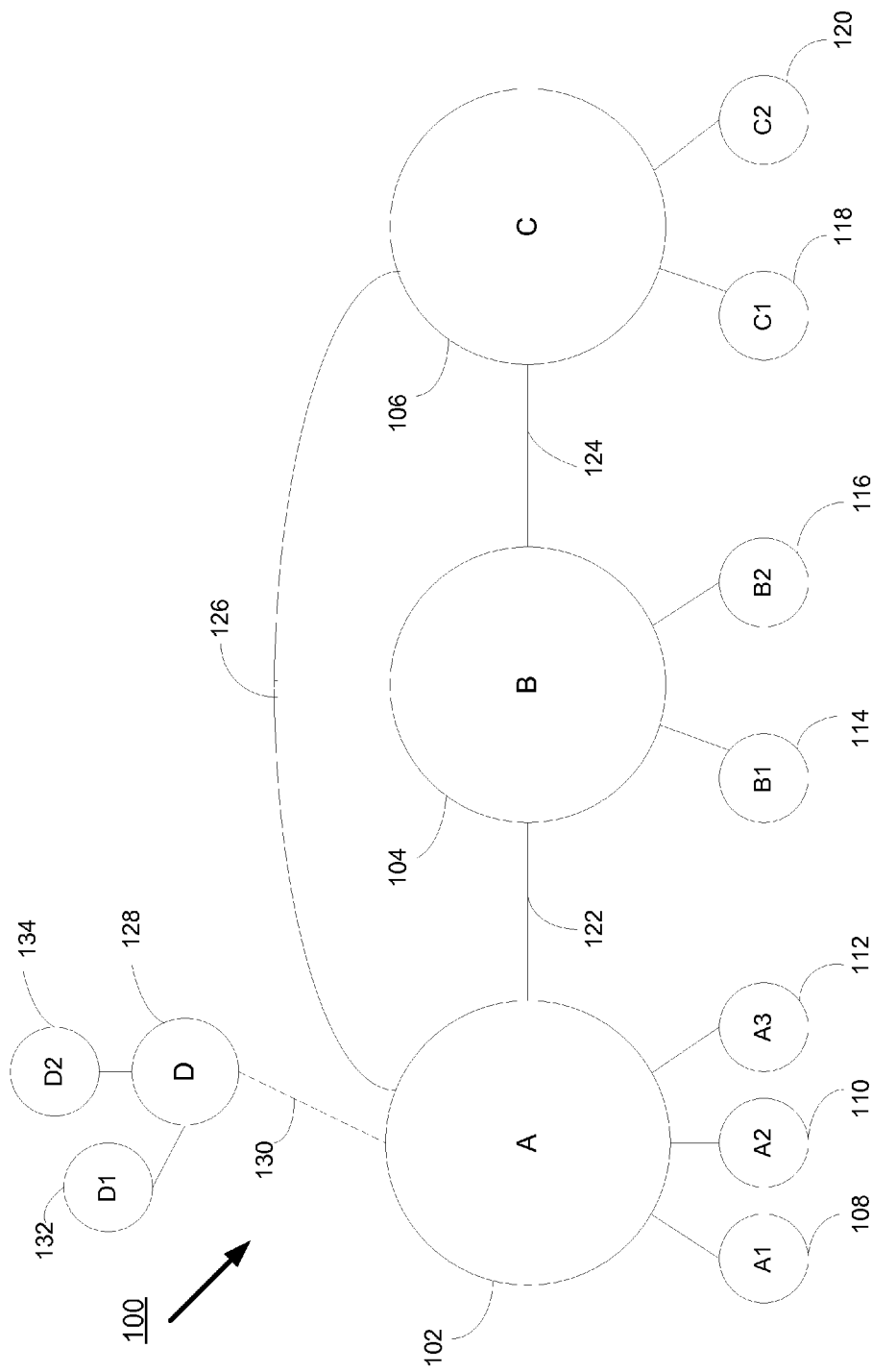
FIG. 1 is a schematic diagram illustrating author disambiguation linking techniques associated with a first embodiment of the present invention.

With reference to FIG. 1, a basic dendrogram 100 is provided showing a clustering of items. Items A 102, B 104 and C 104, are papers, writing or other such publications. Associated with Item A 102 are three authorships A1 108, A2 110, and A3 112 representing the contributions of three co-authors of the work Item A. Associated with Item B 104 are two authorships B1 114 and B2 116 representing the contributions of two co-authors of the work Item B. Associated with Item C 106 are two authorships C1 118 and C2 120 representing the contributions of two co-authors of the work Item C. The lines connecting the authorships to the items A, B and C represent some form of relational link or connection tying the informational objects together. Additionally, relational link 122 connects Item A with Item B and relational link 124 connects Item B with Item C. Relational link 126 connects Item A with Item C, however even without this direct link Item A may be considered linked to Item C by result of the two Items having a common intermediate connection or indirect connection by way of their respective links 122 and 124 to Item B. For instance, based on a predetermined threshold of relatedness, link 126 may be insufficient to independently establish a link between A and C. In addition to or independently of author name data, the threshold is based on a series of factors, such as one or more of the following:

1. Organization, such as university or research institution;
2. Sub-Organization: such as Department Of Microbiology;
3. Location, such as city or postal code;

4. Classification or category codes;
5. Publication year;
6. Index terms, keywords, or significant title words;
7. Co-citation: this is two papers cited together by one or more other papers;
8. Bibliographic coupling: this is two papers that have in common the fact that they cite one or more of the same reference papers;
9. Self cite: this is where an author cites a paper authored by someone with the same name;
10. Co-author: this is two papers both have author A and author B as co-authors; and
11. Email address.

In a preferred embodiment, the threshold to establishing a link and therefore a cluster is based on one or more of items Item D 128 is shown connected to Item A 102 by a dashed line that represents a quasi-link 130. A quasi-link represents some relatedness but perhaps not based on the techniques of the present invention as-described herein. Quasi-link 130 may represent a link established by a known technique, such as Bayesian rules or existing author lists, to independently establish a link between items once the inventive process has determined no link exists or that an insufficient relatedness exists to fully establish a link. This technique may also be applied where the inventive technique has established a relatedness between objects but the relatedness falls below or within a predetermined range of a target threshold. Known techniques may also be applied to confirm or otherwise links established using the techniques discussed in detail below.

As used herein the following terms shall have the following meanings. "DAIS" stands for "Distinct Author Identification System" and is a computerized system for disambiguating a database of informational objects, including papers and other writings, authors, authorships, citations, etc. "Author Entity", the DAIS system creates a unique code to uniquely identify a disambiguated author entity identified by a cluster, also called a "cluster entity." The term "author" is used herein to refer to an actual person having a writing credit to one or more papers or items. The DAIS creates an association between an author and a unique code uniquely identifying a disambiguated author or cluster entity. "Authorship" is a writing credit, an association between an author and a paper, or an instance of an author writing or contribution to a an item, a paper, an article or other publication and where there are more than one person contributing to a work there are "multiple authorships." A given paper or item may have zero or many authorships. "Informational object" refers broadly to any object, such an item, an author, an author entity, or an authorship, that contains or represents information useful to the operation of the DAIS and its processes. "Similarity" is a term that may be used to refer to the degree of relatedness between two items or between an author or author entity and an item where if sufficiently similar the DAIS may establish a link between informational objects. "Clusters" are groupings of linked objects and a cluster once formed may be associated with a unique code or identification number and may represent an author entity or cluster entity. "Sub-clusters" are tightly grouped objects within a cluster that may have stronger relatedness than other objects included in the cluster to which it is a part. "Break Clusters" this refers to the disassociation of items or objects in a cluster or otherwise linked based on some data that refutes the link previously established or prevents a link from being established. "Clustering" process or operation to "score" objects and to link sufficiently similar objects; determining how similar objects are by "scoring" or determining some degree of similarity. "Threshold" is an assigned or determined level on which some further action is based or preconditioned, such as level of relatedness or similarity score that may be required before linking and clustering can occur to form author entity. The threshold may be adjustable, e.g., a "slider" or "sliding window", to make the DAIS process more or less inclusive in forming clusters and assigning unique codes to clusters of objects, i.e., determining sufficient relatedness and distinctness to firm a unique entity.

In one embodiment, the present invention provides a Distinct Author Identification System ("DAIS") for disambiguating data to discern author entities and link or associate authorships with such author entities. The disambiguation processes described herein are applied across one or more databases. Each or some of the databases to be disambiguated may comprise, for example, over a hundred years of scientific papers and other items. Applying the DAIS processes on such databases yield a disambiguated database "DD." In one manner, the DD may represent a database comprising one or more of tables representing associations between authors, author/cluster entities, papers and other items, and other related data. The data and tables contained in the DD may be used in conjunction with the original databases from which information was used in the disambiguation process but are maintained separate from the DAIS system. In this example, the papers or items contained in the database to be disambiguated include only last name and initials related to authors. Partial name data is not fully reliable and used alone across an entire database would lead to errors. For example, "DOE JD" could represent either of actual authors John David Doe or James Donald Doe or Jane Diane Doe. But even full names are not unique as multiple authors may have the same last name, same first name and/or same middle initial or name. One purpose of DAIS is to disambiguate author names to the extent that a useful authoritative author database may be established for operational use. It is not necessary, and may be defeating, to have the DAIS render a 100% error free author database. It is desirous to make as many links as reasonable with a tension between accuracy and effectively clustering and linking data together to provide a useful research tool.

In this embodiment, no existing authority database of authors with identifying biographical information is used. Instead, the DAIS is used to group the authorships to represent particular authors, e.g., John David Doe. The DAIS can also be used to determine how many different "John David Does" or "JD Does" there are, be it zero, one or many. The DAIS processes are used in an "initial evaluation." Because there is no authority database of authors, the entire database is processed by the DAIS to group/link authorships and to identify author entities. The author entities may then be matched or associated with actual authors. In this manner, the initial evaluation may be used to establish an authority database of authors.

Once the initial evaluation is done, additions to the DD or related databases must be handled going forward. This process amounts to matching new authorships to known authors from the authority database of authors previously established by the initial evaluation. For instance, in the initial evaluation the DAIS may save the key distinguishing data elements that established the links, clusters and authority database. These key elements may be used to do subsequent matching. Also, for those authors who first publish after the initial evaluation process, and because any ongoing evaluation process may not be as thorough as the initial evaluation, it may be desired to update the DD. Yet another option is reevaluation by applying the DAIS techniques on all or a subset of the DD or other database. In one manner, reevaluation involves redoing the initial evaluation on a per-author-name basis as needed, e.g., based on the number of author names added or on the relative frequency of a name or how common the name it.

In one embodiment of the invention, a computer-implemented method includes the steps of: receiving a set of electronic information (e.g., authorship, co-authorship, bibliographic data, title, etc.) associated with a set of publications (e.g., articles, papers, etc.). For instance, once an authority database is established, the system may process further "new" or additional documents to supplement the information stored in the authority database. Each publication in the set of publications includes at least one cited reference and has at least one authorship. The method compares at least a portion of the set of electronic information with authorship data contained in an authority database. The authorship data relates to authorship entities represented in the authority database. The set of electronic information is associated with one or more authorship entities. Further, the invention may include linking the at least one authorship to the one or more authorship entities based on determining an authorship similarity between the at least one authorship and the one or more authorship entities. Each authorship entity may be associated with a cluster of authorships and the method may also include adding the authorship to the authority database and associating it with at least one cluster of authorships stored in the authority database.

In keeping with the DAIS process, the authorship entities may have been previously defined at least in part using a disambiguation process, such as previously described hereinabove, and previously stored in the authority database. The set of electronic information may be received subsequent to the disambiguation and storing process with the authorship being linked to a previously defined cluster of authorships. The process may further include: receiving a manual input confirming the linking of the at least one authorship with the previously defined cluster of authorships, and/or receiving a manual input for confirming an association of an authorship with an authorship entity. The association process may include receiving a manual input concerning associating the set of electronic information with the one or more authorship entities. An additional feature of the process may be sending an electronic communication to an email address associated with an authorship entity. For example, a researcher or other user/author having an author profile stored on the database may have an email address also stored at the authority database, on a client side management system, or other system. The DAIS process may automatically generate and send an email to the known author (or related user—e.g., publisher, editor) to confirm or verify authorship information. This may include confirming a set of publications (related authorships) that form a cluster around the unique author identifier associated with that known author. The electronic communication may include a link to enable inputting of a signal confirming an association of an authorship with an authorship entity stored in the authority database. The electronic communication may indicate a potential match of an authorship with an authorship entity stored in the authority database. The process may also include storing the set of electronic information in the authority database; receiving a query related to the one or more authorship entities; presenting authorship data in response to the query; receiving a signal confirming author entity data stored at the authority database. In this manner the DAIS system may maintain an author profile record associated with a unique author identifier and a cluster of authorships associated with the unique author identifier.

The invention may also provide a secure account for electronically accessing data associated with a unique author identifier. Upon secure account access, an authorized user is presented author entity data associated with the unique author identifier stored at the authority database. This may be in response to receiving a request for information. The system may link at least one additional authorship (or publication) to an existing cluster of authorships associated with the unique author identifier in response to a received input associated with the unique author identifier. The system then stores data representing the linking in an authority database of authors. The authority database of authors may include a plurality of unique author entity records each associated with a unique actual author and a cluster.

In another embodiment of the invention, a computer-implemented method includes: presenting data representing a set of publications to a user; providing a user interface for allowing a user to input a selection related to authorship of one or more of the set of publications; and updating an authority database to reflect an association of a unique author with the selection related to authorship of one or more of the set of publications. The invention may further include the steps of: prior to updating the authority database, verifying the association of the unique author with the selected one or more of the set of publications based at least in part on an authorship similarity between data associated with the unique author and a set of one or more authorship entities; receiving a query from a user and presenting the data representing a set of publications in response to the query; generating an electronic message addressed to an electronic mail address associated with the unique author. The invention may further include presenting a notice of a possible erroneous match of a unique author with at least one authorship and, based on a response to the notice, doing one of associating and disassociating the unique author from at least one of an authorship, a cluster, or an author entity. Further, prior to presenting the system may disambiguate authorship data related to the set of publications. The disambiguating process may include scoring an authorship similarity attribute. The scored authorship similarity attribute may be based at least in part on co-authorship data comprise the number of authorships associated with publications. As the number of co-authorships increases, the degree of similarity associated with the co-authorship data decreases. The disambiguating process may include processing at least one of the following elements: email address; co-author data; address data; paper title; cited reference author name; cited by paper; cited by author name; keywords; Publication Discipline Code; co-citation; bibliographic coupling; self cite; and additional author name initial data.

In one manner of operation, a computer is adapted to process a set of electronic information associated with a set of publications, each publication in the set of publications comprising at least one cited reference and having at least one authorship. Software executing on the computer is adapted to: receive a set of electronic information associated with a set of publications; compare at least a portion of the set of electronic information with authorship data contained in an authority database, the authorship data related to authorship entities represented in the authority database; and associate the set of electronic information with one or more authorship entities. The software may include code adapted to: link the at least one authorship to the one or more authorship entities based on determining an authorship similarity between the at least one authorship and the one or more authorship entities.

In yet a further embodiment, a computer implemented method is used for maintaining an authority database of authors. This method includes: receiving from a user data representing a user-defined set of publications each having at least one authorship and related to a unique author; recognizing the received data as being associated with a researcher identifier; using an authority database, verifying the received data to render a threshold confirmation of correctness in association of the set of publications with the unique author; doing one or the other of 1) matching the unique author with an existing unique author profile record stored by the authority database; or 2) creating a new unique author profile record and storing the new unique author profile record by the authority database. The existing unique author profile record may include a cluster of a set of authorships of a set of publications attributed to a unique author represented by the unique author profile record. The unique author profile record may result from disambiguating processes described elsewhere herein.

In one manner of operation, authorship clusters may be formed manually outside of the DAIS process and manually input into the DAIS system. Verification processes may be performed on such manual inputs to maintain integrity of the authority database. New author entities and/or authorships and/or publications may be compared and matched against data existing in the authority database. Upon acceptable confirmation of correctness and integrity, the database may be updated with the additional information. A separate system, such as WoK, WoS, RSS feeds. A research alert system may feed or send lists of publications to the DAIS and allow a user (e.g., an author) authorized to access the system to "claim" a publication as being authored or co-authored by that individual. Such systems may have users with associated Researcher identifiers or the like. The DAIS may recognize and match up the researcher ID information with author identifiers or profiles stored in the authority database. This may provide an enhanced degree of legitimacy or validity to the information submitted to the DAIS.

An API (Application Programming Interface) may be used to integrate or interface outside systems with the DAIS. Client systems may be entitled to use an API to build a layer around the client user access of the DAIS and authority database and may enable closed system use (e.g., a publisher). A module may integrate a client defined submission and peer review process and provide an enhanced author profile. The API may enable services to allow clients to have their data disambiguated for use in a closed system.

In another embodiment of the invention, a computer processes a set of electronic information associated with a set of publications, each publication in the set of publications comprising at least one cited reference and having at least one authorship. Software executing on the computer includes code sets adapted to: receive from a user data representing a user-defined set of publications each having at least one authorship and related to a unique author; recognize the received data as being associated with a researcher identifier; accessing an authority database and verifying the received data to render a threshold confirmation of correctness in association of the set of publications with the unique author; process the received data to do one or the other of 1) match the unique author with an existing unique author profile record stored by the authority database; or 2) create a new unique author profile record and storing the new unique author profile record by the authority database.

In the process of identifying authors and grouping/linking authorships, the DAIS in this embodiment uses "hierarchical clustering" as the methodology of both linking authorships and thereby identifying authors. Establishing links between authorships is based on authorship similarity. Using whatever data we have that's associated with the authorship or with the authorship's paper, the DAIS evaluates the likelihood that authorships are from the same author. For the great majority of data, only last name and initials are captured and available. A relatively high degree of reliably is attributable to the known last name and first initial. In this scenario, the universe of authorships available for clustering must first have the same last name and first initial.

In this first embodiment, the DAIS uses single-link clustering and a high "threshold" level of authorship similarity is required to make a link. Additional techniques available for use by the DAIS include one or more of the following four step process. Step 1, first form clusters using single-link clustering technique based on authorship similarity. Next, Step 2, "breaking" apart clusters by, for example, examining large clusters for instances where cohesive, tightly linked "sub-clusters" are weakly connected to a larger cluster and breaking the weak connection link to break out the sub-cluster into a separate cluster. Next, Step 3, "combining" clusters using, for example, another hierarchical clustering variation and determine if any multi-authorship clusters can me merged into a larger untied, single cluster. Since each cluster has multiple authorships an accumulative weight can be determined and evaluated. With this technique, no single link (between authorships presently in different clusters) needs to reach the high level requirement of the single-link process of Step 1. Step 4, single authorship "cluster cleanup" may be used involving an accumulative point clustering to determine if any loose "single authorship" clusters can be combined with any multi-authorship clusters or other single authorship clusters. Like Step 3, Step 4 can accumulate weight and not require a high similarity or match level as in the single-link of Step 1.

Authorship similarity starts with identifying data elements that are highly reliable in accurately determining an association or link between authorships and author entities. The following elements provide, to varying degrees, reliable data points which may be used to "score" the similarity between various authorships so as to cluster together such authorships to form author clusters and entities which may then be associated with actual authors to establish an authority database of authors. The elements include: 1) address elements (address elements are preferably associated with the paper rather than with individual authors or authorships and include organization (institution), sub-organization (such as department name) and city); 2) co-author names; 3) cited reference papers; 4) cited reference author names' 5) cited by papers; 6) cited by author names' 7) self-cite; 8) email address; 9) keywords (author keywords and keywords plus); 10) Publication Discipline Codes; and 11) additional author initials.

In one preferred embodiment, the list of elements was limited to co-author names, cited reference author names, cited by author names, and email address. Limiting the elements reduces the processing effort required of the DAIS. However, care must be given to consider the nature of the database(s) undergoing the disambiguation process to ensure highly effective and reliable results are achieved.

In addition, the DAIS may further process the results for co-author names, cited author names and cited by author names by further considering how relatively common or unique names are. For example J. Smith is a common name and the DAIS may be adapted to discount the significance, weight or level of distinctiveness attributed to this name. Another optional function is for the DAIS to consider whether a paper has many co-authors or cited authors and to attribute a weighting of association based in part on this data. Moreover, these factors may be considered together through logarithmic expressions that use experimentally produced or otherwise assigned weight factors.

Another option to the DAIS or operational DD is to receive and refine the database based on customer or author feedback.

For instance, authors or other users can inform a party maintaining the DD when authorships are or are not given proper attribution by the database. The independently input or received author data, preferably once verified in some manner, may then be added to the DD and any errors may be corrected, including breaking or combining of clusters/author entities. This information may be captured and treated like other data elements in the database.

Additional techniques, such as Bayesian techniques, may supplement the DAIS processes described herein to combine the individual probabilities of separate elements to obtain a combined score. By doing this the list of elements used may be expanded. Elements not strong enough by themselves to establish a link or association may be strong enough in combination with other elements to establish a link.

Now with reference to FIG. 1, the relational link between Item A and Item B, for instance, may be that authorship A1 has associated with it the author name "Smith, J" and authorship B2 may have associated with it the common name data "Smith, J." This seemingly similar author name data may be a part of and help support a link 122. between Items A and B. However, this incomplete name data in isolation provides a relatively weak link. For instance, if authorship A1 is actually a result of the contribution of actual author "Jane Francis Smith" and if authorship B2 is a result of contribution by actual author "Jeremy Charles Smith" then the link 122 is a false link, at least with respect to author entities or codes unique to the two authors. If on the other hand authorship A1 has associated with it an email address jsmith@abc.org and authorship B2 has associated with it an email address jsmith@abc.org, then there is a much higher degree and much more unique relationship between the two Items A and B and link 122 is much stronger. One aspect of the present invention is that rather than focus on incomplete name data associated with items, the processes focus on more reliable and more unique information to identify, establish and construct clusters to form author entities. Another instance is the manner in which certain information is linked. For instance, rather than associate company or university data with the author, a stronger and more reliable link is between the university and the paper, e.g., J. Smith, Univ. of Alabama—the paper was co-authored by a J. Smith at the Univ. of Alabama, but there might be several J. Smith's at that university.

In addition, even if the link 126 is relatively weak and insufficient to reliably tie Item A with Item C, the intermediate links between Items A and C with Item B may be such that that alone or in combination with the data separately linking Items A and C is sufficient to establish a link between A and C.

Figure 2:
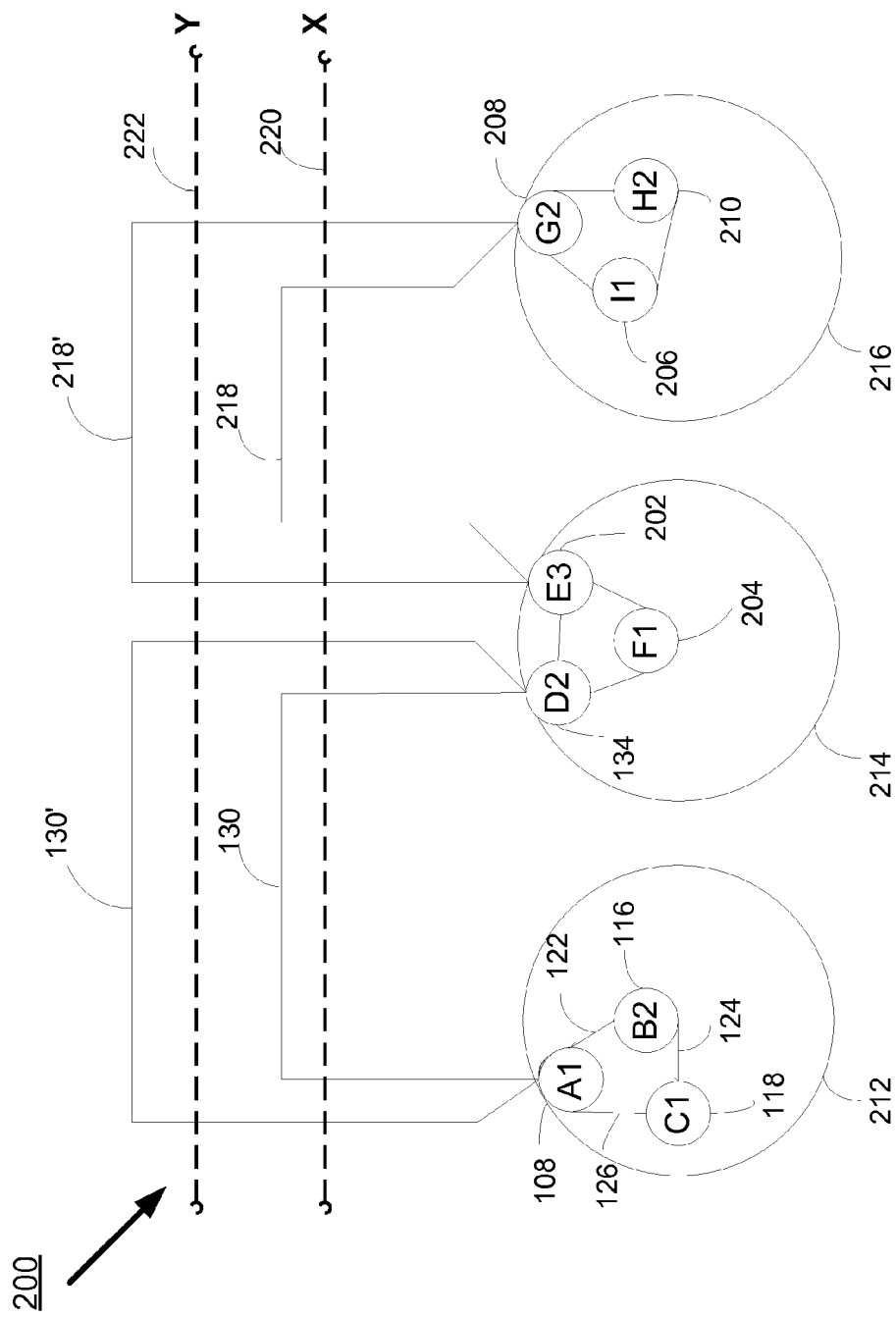
FIG. 2 is a schematic diagram further illustrating author disambiguation linking techniques associated with the embodiment of the first embodiment.

With reference to FIG. 2, authorships A1 108, B2 116 and C1 118 are linked together via links 122, 124 and 126 to form cluster 212. Authorships D2 134, E3 202 and F1 204 are inked together to form cluster 214. Authorships G2 208, H2 210 and I1 206 are linked together to form cluster 216 Clusters 212, 214, and 216 are formed using the inventive techniques discussed herein and for each cluster thresholds of relatedness are sufficiently high to establish the links that form the clusters.

Authorship A1 108 of cluster 212 has two associations or links 130 and 130' with authorship D2 134 of cluster 214. Without either of these links, the two clusters 212 and 214 remain independent of one another. Link 130 may be sufficient to establish a link between the two clusters to form a unified cluster made up of two sub-clusters 212 and 214. For instance, if threshold level X 220 is the level used to determine linking, then link 130 is sufficient to link the two clusters. If threshold X 220 is not sufficient or is merely an intermediate threshold requiring further relatedness linking the two clusters, then more processing is required. A second relatedness link 130' may represent a higher degree of similarity or relatedness and may exceed a second threshold level Y 222 so as to establish a link between clusters 212 and 214 to join them into a larger cluster. In a similar manner, links 218 and 218' may establish links between clusters 214 and 216 so as to join those two clusters into a unified cluster. Based on one or more of the links 130, 130', 218, 218', a larger unified cluster may be formed that includes sub-clusters 212, 214 and 216. In this manner, the linking techniques more fully described below may be applied across one or more databases of items and informational objects to form author entities for further use.

In the clustering process, the system may look to the number of matched common Co-authors, the number of co-authorships in a paper where the fewer number of co-authors there are the higher the value or scoring as compared to a high number of co-authors, and may consider the co-author name. For instance, a score or value of a common name, e.g., "Smith", is lower than the value assigned to an uncommon name, e.g., "Koylouski." The score or factor associated with a given name may be based on the frequency of occurrence of the name in a database or based on an outside source or reference. The "weighted factors" and the results may be "multiplied" based on the number of co-authors/authorships, e.g., $X1 \ln A \times X2 \ln B \times X3 \ln C$, where X1, x2, and X3 are weighted factors associated with term/name frequency. Given that a goal is to associate as many papers with authors as practical while maintaining accuracy, weighted factors may be set (or may be dynamic) to maximize number of links/clusters while maintaining sufficient degree of accuracy and data integrity. Factor may be set based on desired purposes, for example if database search or records are not allowed to have incorrect links/associations, then required level of probability is set at high probability statement, e.g., 100% certain valid link/match.

As an optional feature, the DAIS may incorporate an Automated Author Feedback mechanism. For instance, the DAIS or system operable with the DAIS may present an author with notice that one or more papers have been linked to a cluster identified with the author, i.e., the unique cluster code or author entity code is assigned to or associated with this particular author, and give the author an opportunity to confirm that the papers are his works or are not his works and to accept/reject the link. This "feedback" may be used to correct erroneous links/associations and confirm determined links.

Another optional feature that may be incorporated into an implementation of the invention is permit for new authors/data input after clustering or a re-evaluation after an initial clustering. After running the disambiguation process on the database of information, the system renders a known set of author entities and can place the resulting author/cluster codes in a table and associate the codes with known authors. In this manner an author dictionary or look up is provided and new authors may be detected as new items are loaded into the database. The system may build out a "dictionary of author's/author entities/clusters" for further use or reference.

Figure 3:
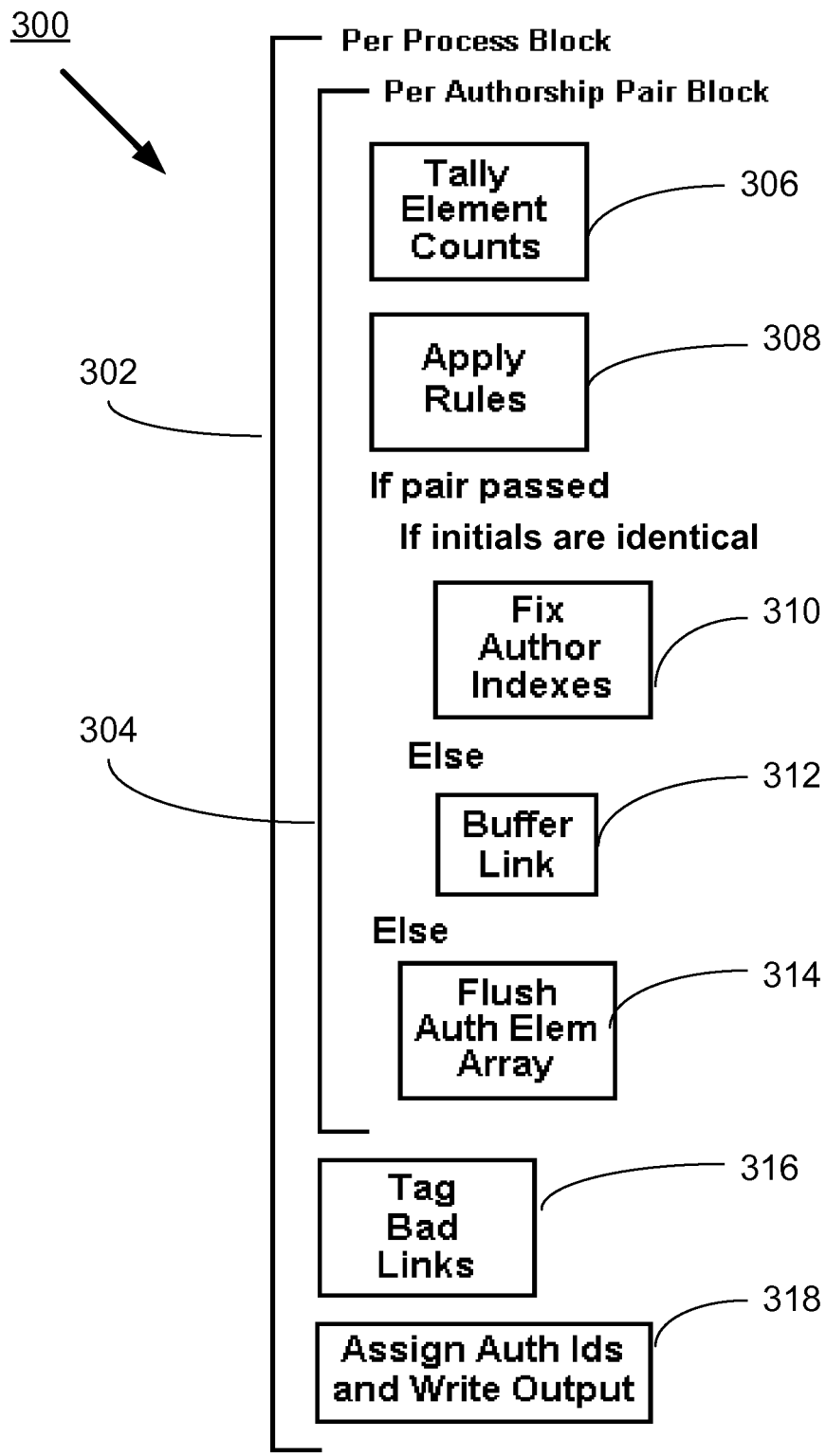
FIG. 3 is a logic flow diagram further illustrating author disambiguation linking techniques associated with the embodiment of the first embodiment.
Figure 4:
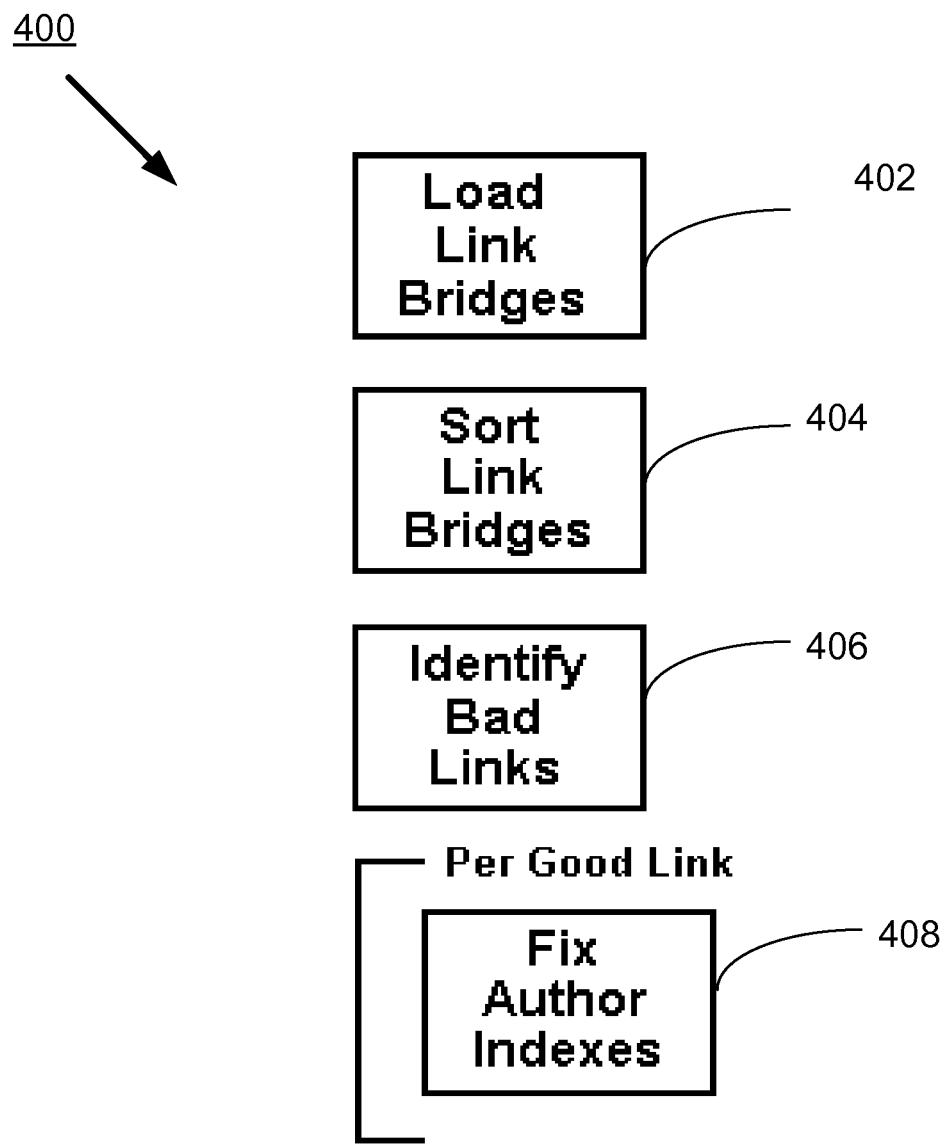
FIG. 4 is a logic flow diagram further illustrating author disambiguation linking techniques associated with the embodiment of the first embodiment.

FIGS. 3 and 4 and related text illustrate an exemplary embodiment of the DAIS Cluster Authorship Process, referenced generally with reference number 300, that is associated with the DAIS and CMS and is more fully discussed below after and in the context of exemplary overall CMS embodiments discussed with reference to FIGS. 5-6.

Figure 5:
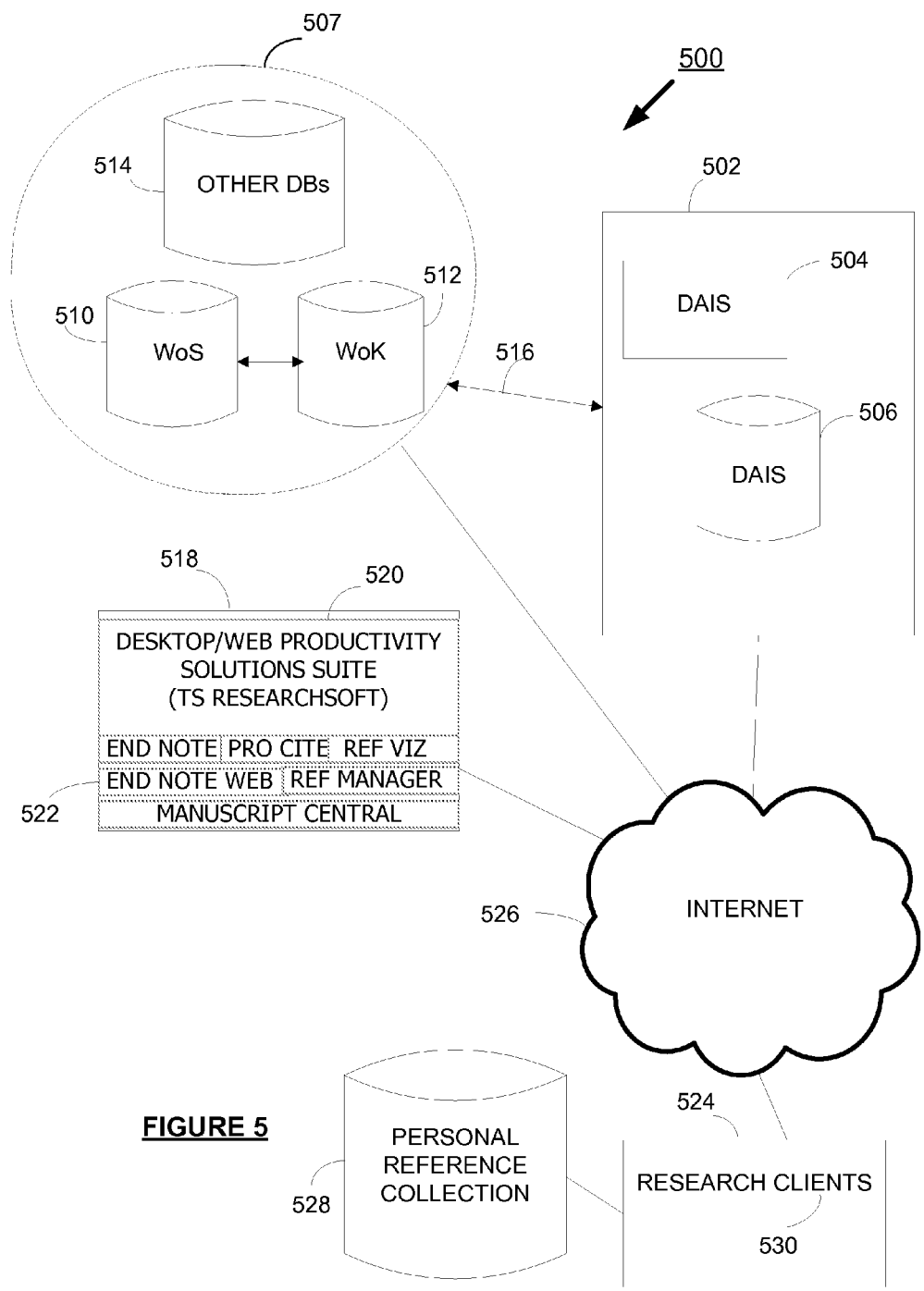
FIG. 5 is a schematic diagram of a content management system utilizing the author disambiguation linking techniques associated with the first embodiment.

With reference to FIG. 5, one exemplary embodiment of a Content Management System (CMS), referenced generally with reference number 500, includes a "Distinct Author Identification System" (DAIS) 502, also referred to as an Author Disambiguation System, a source of information 507, e.g., databases 510, 512 and 514, software and processor driven user productivity suite 518, a plurality of remote users or clients 524 and various communications links. CMS users often want to search for, identify and access items, such as papers and other publications, by certain attributes associated with those items. For instance if a user searches using a certain author name often they only have the author's last name and perhaps first and middle initials. This abbreviated and non-unique author information does not uniquely identify the author from the universe of author names being searched. The purpose of DAIS 502 is to disambiguate records stored in stores 507 to, among other things, identify distinct authors; assign author identifiers (ids) to them; and tag their authorships with their author ids to facilitate such searching by users 524.

In this exemplary embodiment of FIG. 5, the stores available for searching include the WoS Database 510, the WoK Database 512 and a general reference to other databases of interest 514, such as OPAC and PubMed databases. The DAIS 502 communicates with stores 507 via a communications link 516 and captures and uses for disambiguation processes instances of all or portions of such databases. The DAIS 502 applies the DAIS rules and processes, referenced generally by reference number 504, against the records stored in such databases to arrive at accurate relational links and clusters of links to properly associate with author entities.

For purposes of explaining the overall process and not by way of limitation to the invention, the WoS DB 510, for example, is an XML database that spans a range of years of data, including scientific papers and citations associated therewith. The WoS DB instance used by DAIS 502 is separate from the WoS DB 510, which may be used by WoS customers and which is kept for independent and unaltered research, testing or various special processing. There are two principal unit records in this database. They are <item> (source item) and <ref> (reference item).

Once the DAIS 502 has applied its processes 504 against and across the database instances from sources 507, it may load onto such databases 510, 512, and 514 the disambiguated records and data as a way to improve the integrity of the information stored in such databases and for subsequent use by users. For instance, users, such as remote users 524 and others, may invoke productivity solutions, such as Thomson Scientific's Research Soft suite, in carrying out the business of science and research and in authoring works associated with those efforts. Such productivity tools may be used by administrators, such as faculty and university administration, in conducting the business of the institutions, for example in reviewing the work of faculty up for tenure and under review. Researchers may keep a personal reference collection 528 of works of their own, of works relied on and referenced in their works, and of works of interest in their particular fields of study.

Figure 6:
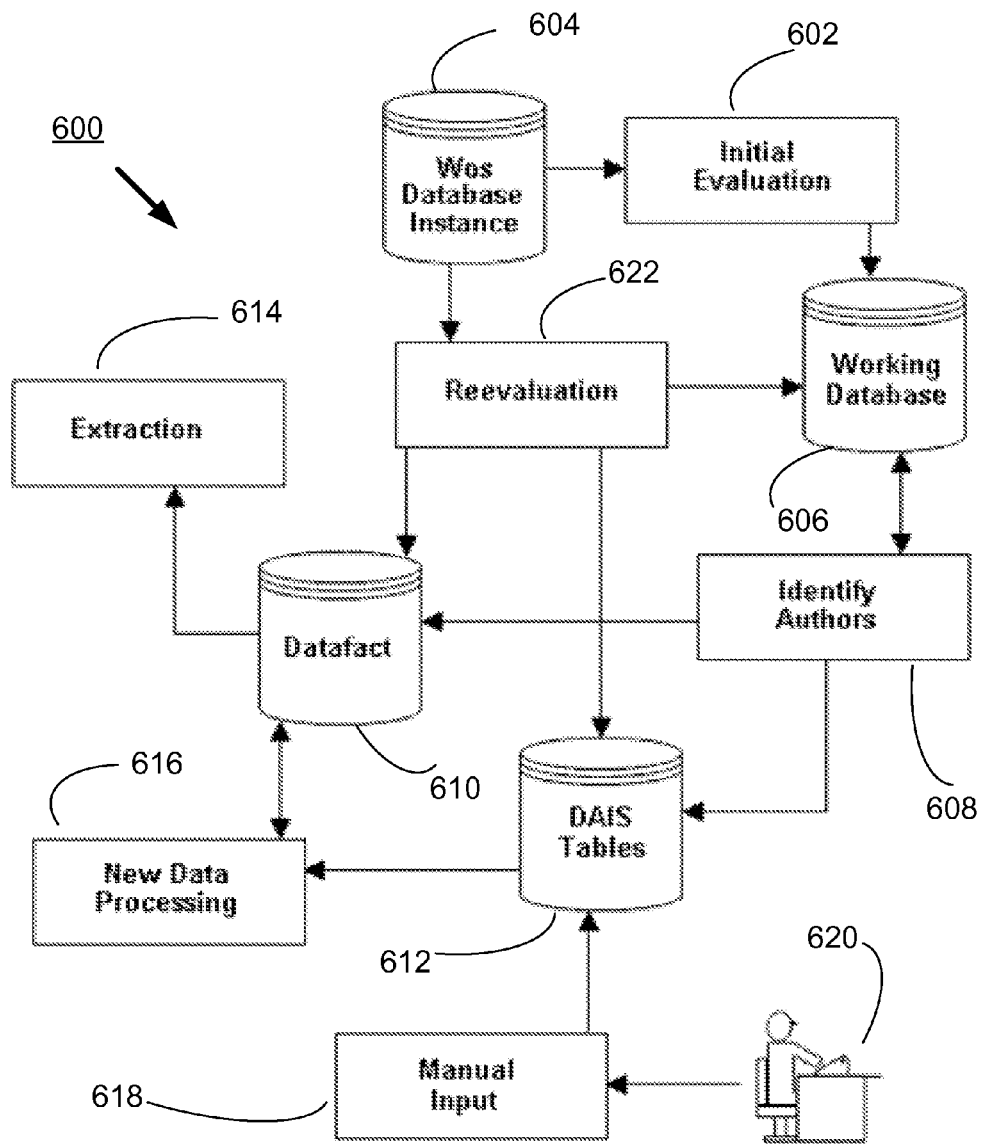
FIG. 6 is a schematic diagram of a content management system utilizing the author disambiguation linking techniques associated with the first embodiment.

With reference to FIG. 6, another embodiment of a Content Management System (CMS) 600 includes a "Distinct Author identification System" (DAIS) comprised of numerous elements as discussed further below. The CMS 600 here has the same purposes as discussed above with respect to CMS 500. In this exemplary embodiment of FIG. 6, the DAIS includes a WoS Database Instance 604, which for purposes of explaining the invention and not as a limitation to the invention shall be described here as an XML database that spans a range of years of data, including scientific papers and citations associated therewith. The WoS DB instance 604 used by the DAIS is separate from the WoS DB from which it was derived and as used by WoS customers, which is kept for independent and unaltered research, testing or various special processing. WoS, or other databases, may be updated from time to time in whole or in part using the disambiguation techniques described herein.

In this database example, there are two principal unit records in this database. They are <item> (source item) and <ref> (reference item). The database 604 may be segmented with each segment having a name like "WoS.2005000050". The distinguishing file number "2005000050" may be, for example, composed of a year and sequence number. Corrections are not made directly to the XML. A new version of the bad data (item or ref) is written to the latest segment and the old version simply is no longer used. When reading sequentially through a segment there is no way to know which records are no longer used. "Datamap" files are used so that datamap records point to valid data records. In this example, datamap records are 32 bytes consisting of eight four-byte unsigned binary numbers and the following are used for illustrative purposes:

recid—record identifier for data
item file number—file extension number having item data
item offset—byte offset of the item data record
item length—number of bytes in the item data record
ref file number—file extension number having ref data
ref offset—byte offset of the ref data record
ref length—number of bytes in the ref data record
filler—ignore the number With reference to FIG. 6, DAIS is represented as a multi-step, integrated process involving multiple databases and processing modules. In the Initial Evaluation process 602, data is extracted from, for example, the WoS Database Instance 604 and stored in a working DB2 database 606. This arrangement is one example of a DAIS database 506 from FIG. 5. From working DB 606 data is extracted in segments to flat files. The "Identify Authors" process 608 consists of multiple steps as more fully described below. Intermediate steps create intermediate files which are considered part of the working database 606. When the process of identifying authors and assigning author ids is completed, the data in the working database may be discarded. The following Table 1 represents an example of the relational structure of working DB 606 in this example.

TABLE 1

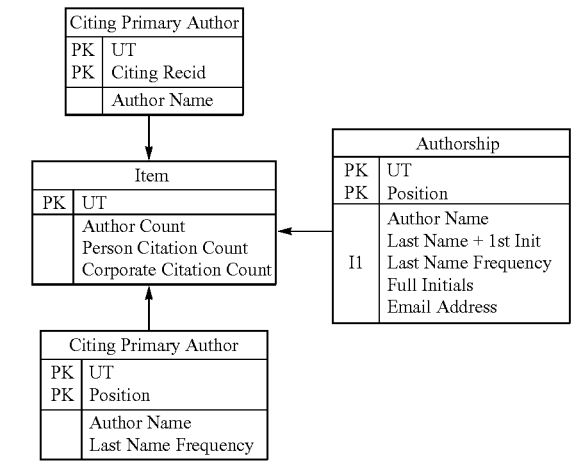

The following Table 2 represents an example of a Data Elements File used in the DAIS. In Table 2, fields in this file are at fixed byte positions. Character fields are left justified and padded with trailing spaces. Integer fields are right justified and padded with leading zeros.

TABLE 2

| Fields | Type | Byte Range |
|---|---|---|
| Last Name + 1$^{st}$ Initial | Char(40) | 1-40 |
| Element Type | Integer | 41 |
| Data | Char(100) | 42-141 |
| UT (Item Identifier) | Char(15) | 142-156 |
| Position | Integer | 157-161 |
| Full Initials | Char(4) | 162-165 |
| # of Authors | Integer | 166-170 |
| # of Grp Auth Citns | Integer | 171-175 |
| # of Pers Auth Citns | Integer | 176-180 |
| Auth Frequency | Integer | 181-185 |

In the following Table 3, a Data Matches File used in the DAIS is shown. In Table 3, fields in this file are at fixed byte positions. Character fields are left justified and padded with trailing spaces. Integer fields are right justified and padded with leading zeros.

TABLE 3

| Fields | Type | Byte Range |
|---|---|---|
| Last Name + 1$^{st}$ Initial | Char(40) | 1-40 |
| 1$^{st}$ Item UT | Char(15) | 41-55 |
| 1$^{st}$ Item Position | Integer | 56-60 |
| 2$^{nd}$ Item UT | Char(15) | 61-75 |
| 2$^{nd}$ Item Position | Integer | 76-80 |
| Element Type | Integer | 186-190 |
| Data | Char(100) | 191-195 |
| 1$^{st}$ Item Full Inits | Char(4) | 182-185 |
| 1$^{st}$ # of Auths | Integer | 186-190 |
| 1$^{st}$ # of Grp Auth Citns | Integer | 191-195 |
| 1$^{st}$ # of Pers Auth Citns | Integer | 196-200 |
| 2$^{nd}$ Full Ints | Char(4) | 201-204 |
| 2$^{ND}$ # of Auths | Integer | 205-209 |
| 2$^{nd}$ # of Grp Auth Citns | Integer | 210-214 |
| 2$^{nd}$ # Pers Auth Citns | Integer | 215-219 |
| Auth Frequency | Integer | 220-224 |

In the following Table 4, an Author Id File used in the DAIS is shown. In Table 4, the Author ID file is created by the "Cluster Items" process as described herein below and is used as an import file for the Author_Id table.

TABLE 4

| Fields | Type |
|---|---|
| Issueno | Integer |
| Itemno | Integer |
| Authseq | Integer |
| Authorid | Integer |

In the following Table 5, an Author Element File used in the DAIS is shown. This file is created by the "Cluster Items" process and is used as an import file for the Author_Data table.

TABLE 5

| Fields | Type |
|---|---|
| Last Name + 1$^{st}$ Initial | Char(40) |
| Element Type | Integer |
| Data | Char(100) |
| Authorid | Integer |

In the following Table 6, an Evaluation File used in the DAIS is shown. In Table 6, the Evaluation file is created by the "Cluster Items" process and is used as an import file for the Author_Id Reevaluation table.

TABLE 6

| Fields | Type |
|---|---|
| Last Name + 1$^{st}$ Initial | Char(40) |
| Evaluation Auth Cnt | Integer |
| Post Eval Auth Cnt | Integer |
| Last Evaluation | Timestamp |
| Urgency | Decimal |

The Datafact database 610 is at the core of the Content Management Systems 600 and consists of a large number of tables. An Author ID table is created having one row for each authorship whose author has been identified. This table, illustrated below in Table 7, associates authorships with author ids. This table is used to assign author ids when items are extracted.

TABLE 7

| | Author_Id | |
|---|---|---|
| PK | Issueno | integer |
| PK | Itemno | smallint |
| PK | Authseq | smallint |
| | Authid | integer |

The DAIS Tables Database 612 provides any additional tables needed to support the DAIS system. Lname_Freq_Dict (Last name frequency dictionary) is an exemplary table consisting of the primary key (PK) "last_name" plus one data column "frequency". Author last names are looked up to get the frequency. The frequency is a count of how many different combinations of initials have been found with that last name in the working database of source items.

TABLE 8

| | Author_Data | |
|---|---|---|
| PK | LName_Init | varchar(38) |
| PK | Data_Type | smallint |
| PK | Data | varchar(75) |
| PK | Authorid | integer |

Table 8 represents the Author_Data table that is used by the "New Data Processing" process 616 to assign existing author ids to newly loaded source items. The data for this table is created by the "Initial Evaluation" 602 and "Reevaluation" 622 processes. Matched data between clustered items are stored in this table.

As used in the Author_Data Table 8, LName_Init represents the author's last name and first initial, and Data_Type represents a numeric code that identifies the type of data that matched. As described in more detail elsewhere herein, in one embodiment the four data types or data elements used to determine a match and to establish a link are:
1—Co-Author
2—Cited Author
3—Citing Author
4—Email Address Also included in the Author Data Table 8 are "Data" which represents the data that matched, and "Authorid" which represents the author id assigned by "Initial Evaluation" or "Reevaluation" processes 602 and 622 respectively.

Another table included in DAIS Tables 612 is the Author_Id_Control Table 9. As shown below, this table keeps the last author id number assigned. It only has one row. Control_Key='LAST AUTHOR ID' and Control_Ident has the value of the last author id used.

TABLE 9

| | Author_Id_Control | |
|---|---|---|
| PK | Control_Key | Char(25) |
| | Control_Ident | integer |

Table 10 represents the Author_Id_Reevaluation tables. This table keeps track of when an author's name needs to be reevaluated. The reevaluation process, the Identify Authors and New Data Processing processes, 622, 608 and 616 respectively, may store information in this table.

TABLE 10

| | Author_Id_Reevaluation | |
|---|---|---|
| PK | Last Name + 1st initial | Char(40) |
| I1 | Evaluation Auth Cnt | Integer |
| | Post Eval Auth Cnt | Integer |
| | Last Evaluation | Timestamp |
| | Urgency | Decimal |

Last Name+1.sup.st Initial is the primary key of Table 10 with one row per "Last Name+1.sup.st Initial" (or "Process Block"). When a Process Block is reevaluated all authorships with its "Last Name+1.sup.st Initial" are reevaluated. The integer field "Evaluation Author Count" represents the number of authorships for this process block at the time it was last evaluated. The integer field "Post Evaluation Author Count" represents the number of authorships for this process block since the time it was last evaluated. "Last Evaluation" is a timestamp identifying the last time this process block was evaluated. "Urgency" is a calculated value. Urgency=Post Evaluation Author Count/(Evaluation Author Count+Post Evaluation Author Count). The higher the value the more urgent it is to reevaluate this "Last Name+1.sup.st Initial". The reevaluation processes 622 will use this index to determine what needs to be reevaluated. It will process all rows where the urgency is greater than a threshold value, for example possibly "0.5."

One goal of the Initial Evaluation process 602 is to create the Data Elements File segments that will go into the Identify Authors process 608. This is a multi-step process that includes the process of Creating Temporary Datamap files, in which the datamaps are also segmented. There currently are 14 segments. When the 14.sup.th reaches a certain size, a 15.sup.th will be started. The permanent datamaps just like the data files can have dead records due to deletions. The temporary datamaps will have these dead records removed. Header records will also be removed. The Initial Evaluation Process 602 may also include a program "dmperm2temp" that will create temporary datamaps from the permanent datamaps. The program makes a pass through all of the permanent datamaps and creates a temporary datamap based on year. Separate temporary datamaps are created for both items and refs. For each 19 temporary datamaps segmented by year are created as shown in the following table.

TABLE 11

| Chunk# | Year Range |
|---|---|
| 1 | 1941-1966 |
| 2 | 1967-1975 |
| 3 | 1976-1980 |
| 4 | 1981-1984 |
| 5 | 1985-1987 |
| 6 | 1988-1990 |
| 7 | 1991-1992 |
| 8 | 1993-1994 |
| 9 | 1995 |
| 10 | 1996 |
| 11 | 1997 |
| 12 | 1998 |
| 13 | 1999 |
| 14 | 2000 |
| 15 | 2001 |
| 16 | 2002 |
| 17 | 2003 |
| 18 | 2004 |
| 19 | 2005 |

The item temporary datamaps are sorted by item file number, item offset. The ref temporary datamaps are sorted by ref file number, ref offset. Sorting the temporary datamaps will ensure that when sequentially passing through them, the process sequentially passing through the corresponding data files also. To do this, a program called "gbdmsort2" is used. This program expects a certain xml environment. To satisfy this, a config.xml file and a catalog.xml file are used.

The process of Extracting Item Data is carried out by a program "DAIS001" that makes a pass through each of the item temporary datamaps and makes lookups to the appropriate <item> records. Output files should use the extension number of the datamaps. The process may skip over—without extracting to any file—any items that have <primaryauthor>[Anon]</primaryauthor>, i.e. anonymous authors. Included in the exemplary process described are the following five tab field separated, text output files:

Item01.*—one output record per <item> as shown in Table 12.

TABLE 12

| Field | From |
|---|---|
| UT | <ut> element |
| Author Count | the count attribute of <authors> |

Cited01.*—one output record per <ref> as shown in Table 13.

TABLE 13

| Field | From |
|---|---|
| UT | <ut> element |
| Position | the ordinal position of the <ref> element. The 1$^{st}$ <ref> is position 1 |
| Ref Rec Id | ... <br> the <ref> element |

Certain types of documents as records, e.g., patents, may be treated specially. For instance, the process may not write out a Cited01 record for patents. Patents are type="patent".

```
<item>
  <ref type="patent"...
</item>
```

ItemDict.*—one output record per <item> as shown in Table 14.

TABLE 14

| Field | From |
|---|---|
| UT | <ut> element |
| Item Rec Id | the recid attribute of <item> |

Authship01.*—one output record per <authors> element as shown in Table 15.

TABLE 15

| Field | From |
|---|---|
| UT | <ut> element |
| Position | the ordinal position of the <ref> element. The <primaryauthor> value is position; the 1$^{st}$ <author> is position 2 . . . |
| Author | <primaryauthor> or <author> |
| Email Address | It's the <email_addr> value that corresponds to the <name> value equals the <primaryauthor> or <author> for this record. This field wont always wxist. |

Citing01.*—one output record per <ref> (within <item>) as shown in Table 16.

TABLE 16

| Field | From |
|---|---|
| Ref Rec id | The <ref> element (within <item> record). |
| Author Name | <primaryauthor> |

The process of Extracting Ref Data is carried out by a program "DAIS002" and makes a pass through each of the item temporary datamaps and makes lookups to the appropriate <ref> records. Output files should use the extension number of the datamaps. The process may skip over—without extracting—any references that meet any of the following:
 1. No author attribute.
 2. The value of auth attribute is "ANON".
 3. The value of auth attribute is "ANONYM".
There will be one tab field separated, text output file representing the extracted reference data:
 RefAuth01.*—one output record per <ref>

TABLE 17

| Field | From |
|---|---|
| ref rec id | the recid attribute of <ref> |
| ref author | the auth attribute of <ref> |

Next, the process includes Loading the DB2 Working Database 606. The object here is to create files that can be imported into the DB2 tables. The import is much faster than programmatically inserting rows. Files are processed and imported into the Cited Primary Author table as follows. The Item table, see Table 12, should be loaded first because it is the parent of the other tables. However two of the elements it needs are derived while processing the cited authors, see Table 13, and so the process starts with the cited authors. In preparation to a sort merge is performed on all the RefAuth01.*files from Table 17 into one file "RefAuth", sorted by "Ref Rec Id". Each Cited01.*file from Table 13 is sorted by "Ref Rec Id" creating Cited02.* files.

A program "DAIS003" processes the Cited02.* files one file per run. While reading a Cited02.* file DAIS003 also reads RefAuth and keeps the "Ref Rec Ids" synchronized. DAIS003 produces a tab field separated, text output file per Cited02.* file, Cited03.*—one output record per input Cited02.* record—as shown in Table 18.

TABLE 18

| Field | From |
|---|---|
| UT | Cited02.* |
| Position | Cited02.* |
| Author Name | Get the "ref author" field from the "RefAuth" file where "Ref rec Ids" between RefAuth and Cited02.* match |
| Last Name Frequency | Get the Last Name Frequency using the Author Name as described in routine 4.2. |

The Cited03.* files are sorted by UT and Author Name to eliminate duplicates. Next the files are sorted by "UT, Position" yielding files called Cited04.*, which are then imported into the Cited Primary Author table (after the Item table has been loaded).

Next the process sorts the Item01.* files from Table 12 by UT creating Item02.* files. A program "DAIS004" processes the Item02.* files one file per run. While reading an Item02.* file, DAIS004 also reads the previously created Cited04 file with the same file extension. The two files should be synchronized by UT (usually there will be multiple Cited04 records per one Item02 record). For each run, a tab field separated, text output file "Item03.*" should be created—one output record per input Item02.* record—as shown in Table 19.

TABLE 19

| Field | From |
|---|---|
| UT | Item02.* |
| Author | Item02.* |
| Count Person Citation | Among the Author names in Cited04 for this UT, how |
| Count | many of them didn't start with "*". |
| Corporate Citation | Among the Author names in Cited04 for the UT, how |
| Count | many of them started with "*". |

These files "Item03.*" can now be imported into the Cited Primary Author table and Cited04.* can now be imported into the Cited Primary Author table.

Next, the Authship01.* files from Table 15 are sorted by (UT, Position) creating Authship02.* files, a program "DAIS005" processes the Authship02.* files one file per run. For each run, a tab field separated, text output file "Authship03.*" should be created—one output record per input Authship02.* record—as shown in Table 20.

TABLE 20

| Field | From |
|---|---|
| UT | Authship02.* |
| Position | Authship02.* |
| Author Name | Use the Author Name from Authship02.* and routine 4.3 |

TABLE 20-continued

| Field | From |
|---|---|
| Last Name + 1st Initial | ISI Format Author Name to get a name in ISI format. Get the last name and initials as described in routine 4.1. If no initials exist then leave this field empty. Build this string as "last name" +" "+the 1st initial. There should be a single space between the last name and the first initials after the 1st initial should not be included. |
| Last Name Frequency | Get the Last Name Frequency using the Author Name as described in routine 4.2. |
| Full Initials | Get the initial as described in routine 4.1. |
| Email Address | Authship02.* |

Next the Authship03.* files are sorted by UT and Author Name to eliminate duplicates and then the files are sorted by "UT, Position" yielding files called Authship04.*, which are then imported into the Authorship table.

Files are processed and imported into the Citing Primary Author table as follows. The Citing01.* files are sorted by "Ref Rec Id" to create Citing02.* files. Next, merge and sort all of the ItemDict.* by "Item Rec Id" to create ItemDict. A program "DAIS006" processes the Citing02.* files one file per run. While reading a Citing02.* file DAIS006 also reads the ItemDict. The two files are synchronized by "Rec Id". For each run, a tab field separated, text output file "Citing03.*" should be created as shown in Table 21. In creating Citing03.*, one output record results for each instance where a Citing02.* record matches an ItemDict record on "Rec Id".

TABLE 21

| Field | From |
|---|---|
| UT | ItemDict |
| Citing Recid | Cited02.* |
| Author Name | Use the author Name from Citing02.* and routine 4.3 ISI Format Author Name to get a name in ISI format. |

Because UT and RecId do not necessarily uniquely identify a citing instance and because duplicate records may occur across years, the unix "cut" command may be used to drop the RecId field from the Citing03.* files. Then the files may be concatenated together and sorted to eliminate dups. Program "dais011" generates sequence numbers in place of the RecId so that UT plus the sequence number uniquely identify citing records. Now the data can be imported into dais_citing auth.

Next, the DAIS process Extracts Data Elements File Segments as follows. Data is extracted from the working DB2 database 606 into the Data Elements File format to facilitate data element matching between items. For practical and efficiency reasons the Data Element File should not be a single file but instead it should be in manageable segments. A program "DAIS007" extracts a Data Element File Segment. The program DAIS007 accepts start and end parameters as arguments with four character strings—for example 'AABA', 'ADAM'. This "range" of character strings means that author names from AABA (low values) thru ADAM (high values) will be processed.

Next, start and end values and the "Last Name+1.sup.st Initial" index are used to find Authorship rows. For purposes of this description authorships found via "Last Name+ 1.sup.st Initial" will be referred to as the "target" authorships. For each target authorship the UT is used to retrieve the Item row, all other Authorship rows, all "Cited Author" rows and all "Citing Author" rows where the author name does not equal the author name of the target authorship. Next, a "Data Elements File" record is written for each data element. The data elements and "element types" are as described below.

TABLE 22

| Type | Data Element Description |
|---|---|
| 1 | the author name for each row in the Authorship table for the UT except the target authorship |
| 2 | the author name for each row in the Cited Primary Author table for the UT |
| 3 | the author name for each row in the Citing Primary Author table for the UT |
| 4 | the Email Address for the target row of the Authorship table |

In the extraction process, a Data Elements File represents the output file for the DAIS007 program and is described above in the context of the working database 606. Table 23 below describes the source for the data and the fields.

TABLE 23

| Type | |
|---|---|
| Data | either the author name from a non-target row of the Authorship table or the author name of a Cited Primary Author row or the author name of a Citing Primary Author row or the Email Address of the target row of the Authorship table |
| UT | any table |
| Position | the target row of the Authorship table |
| Full Initials | the target row of the Authorship table |
| # of Authors | item table |
| # of Grp Auth Citns | item table |
| Auth Frequency | if the Data field is an author name from either the Cited Primary Author or Authorship table then this field should get the Last Name Frequency from the same row; otherwise this field should be empty. |

The following example, represented by combined Table 24, shows the pertinent rows for just one row found in the Authorship table via the "Last Name+.sub.1st Initial" index, referred to as the "target author". This example shows only one target author—"ABSTREITER GR". All the other rows are associated by UT value.

TABLE 24

| Authorship | | | |
|---|---|---|---|
| UT | Pos | Author Name | L Name 1st Init |
| 000225237800013 | 1 | YUAN JL | YUAN J |
| 000225237800013 | 2 | ABSTREITER GR | ABSTREITER G |
| 000225237800013 | 3 | BERRY J | BERRY J |

TABLE 24-continued

| ... Authorship | | |
|---|---|---|
| L Name Frequency | Full Init | Email Add |
| 871 | JL | jlyuan@zjut.edu.con |
| 23 | GR | gabstreiter@sohu.com |
| 342 | J | berryj@king.igs.net |

| Item | | | |
|---|---|---|---|
| UT | Ath Cnt | P Ct Cnt | C Ct Cnt |
| 000225237800013 | 3 | 3 | 1 |

| Citing Primary Author | | |
|---|---|---|
| UT | Ct RecId | Author Name |
| 000225237800013 | 141965784 | FLINDT C |
| 000225237800013 | 141966076 | FREERICKS JK |

| Cited Primary Author | | | |
|---|---|---|---|
| UT | Pos | Author Name | L Name Freq |
| 000225237800013 | 1 | HOGG MA | 89 |
| 000225237800013 | 2 | TRIMPOP RM | 31 |
| 000225237800013 | 3 | MONTEIROLEAL LH | 23 |
| 000225237800013 | 4 | *IBM | 1 |

As represented at Table 25, in this example, "ABSTREITER G" was found because it was in the range being searched, i.e., between MBA and ADAM. All the other rows were joined by UT. From this, nine output rows in the "Data Elements File" segment are generated. All nine records have the field values shown in the table.

TABLE 25

| Field | Value |
|---|---|
| Last Name + $1^{st}$ Initial | ABSTREITER G |
| UT | 000225237800013 |
| Position | 2 |
| Full Initials | GR |
| # of Authors | 3 |
| # of Grp Auth Citns | 3 |
| # of Pers Auth Citns | 1 |

The nine output records have different values for the other fields as shown in Table 26.

TABLE 26

| E Type | Data | A Freq |
|---|---|---|
| 1 | YUAN JL | 871 |
| 1 | BERRY J | 342 |
| 2 | HOGG MA | 89 |
| 2 | TRIMPOP RM | 31 |
| 2 | MONTEIROLEAL LH | 23 |
| 2 | *IBM | 1 |
| 3 | FLINDT C | |
| 3 | FREERICKS JK | |
| 4 | gabstreiter@sohu.com | |

After the Initial Evaluation Process 602, the DAIS applies the Identify Authors processes 608 against the working database 606. In the initial Sort Data Elements File process, a system sort is used to sort the data elements file by Last Name+1.sup.st Initial, Element Type, Data, UT and Position to eliminate duplicate records. For example:

sort-k 1.1,1.161-u-T.-odataele2.001 dataele.001

Next, in the Match Element Data process, a program "DAIS008" makes a pass through the sorted Data Elements File and creates the Data Matches File. For every instance where two records in the Data Elements File have the same values for "Last Name+1.sup.st Initial, Element Type and Data" one record will be created in the Data Matches File. In the example below ".fwdarw." represents a tab and the following record data is used.

Input Data Elements File Records
Cu W→1 XU X→000212337800013→2→WA→6→0→55→571
GU W→2 XU X→000212337800013→2→WA→6→0→55→571
GU W→2→XU X→000125239100123→1→WAB→1→2→152→571
GU W→2→XU X→000157237200419→3→W→116→0→89→571
Output Data Matches File Records
GU  W→000212337800013→2→000125239100123→1→ ... 2→XU X→WA→6→0→55→WAB→1→2→152→571
GU W→000212337800013→2→000157237200419→3→ ... 2→XU X→WA→6→0→55→W→116→0→89→571
GU W→000125239100123→1→000157237200419→3→ ... 2→XU X→WAB→1→2→152→W→116→0→89→571

Next, in the Sort Data Matches File process a system sort is used to sort the data matches file by Last Name+1.sup.st Initial, 1.sup.st Item UT, 2.sup.nd Item UT and Element Type.

Next, the Cluster Authorships process uses a program "DAIS009" to make a pass through the sorted Data Matches File; make the author identification decisions; assign the author ids; write them out to the "Author Id" file and write out the matching elements to the "Author Element" file. The section below identified as "DAIS Cluster Authorships" describes this process in detail.

After Author disambiguation, clustering and finalizing and loading the CMS database with disambiguated data, from time to time and upon certain events it may be desired to process new records or data or segments or portions of the database for additional linking. The New Data Processing module 616 operates as follows. A program "DAIS010" runs post load and processes newly loaded source item authorships, for example. For each authorship, "Last Name+1.sup.st initial" plus each data element (co-authors, cited authors, citing authors and email address) are used in performing lookups to the Author_Data table. If no rows match any of these lookups, then no author id is assigned to the authorship. If at least one lookup returns a row, and all returned rows for this authorship have the same author id value, then use that author id to insert a row into the author id table. If returned rows for the same authorship have different author id values, then no author id is assigned to the authorship. The disambiguated data may also include hyperlink data to associate authorships or author entities, for example, with electronic publications records contained on publications databases.

In the Extraction process 614, the system extracts from Datafact 610 to a tagged data file. In this case Author Id is a new field and a new two-character code needs to be assigned to it and the extraction program(s) to extract this field need to be modified accordingly.

Periodically or upon an event, the CMS 600 may invoke a Reevaluation process 622, which operates as follows. Reevaluation is the re-processing of an author name "last name+1.sup.st Initial". For example, Smith, J. and especially for common last names since it is more likely that a larger number of publications and associated records will be added to the database under common author names. In one manner, the Urgency column in the Author_Id_Reevaluation table will determine which author names need to be reevaluated. A triggering event could be a threshold number of papers added to the database with a particular author last name or name format, that may or may not involve truncation. If the first character of the author's name is "*" then it's a corporate name and the DAIS should not try to isolate a last name. The last name is everything starting with the left most character scanning right until you reach a space " " or period ".". Table 27 provides an example.

TABLE 27

| Author's Name | Last Name | Initials | Truncated | Corporate |
|---|---|---|---|---|
| MENNESSIER MO | MENNESSIER | MO | No | No |
| *US DEP TRANSP | *US DEP TRANSP | | No | Yes |
| VENKATAKRISHNAB.H | VENKATAKRISHNAB | H | Yes | No |
| KATSELIPAPAEFST.LT | KATSELIPAPAEFST | LT | Yes | No |
| ELTON LRB | ELTON | LRB | No | No |
| BLOMSTRAND | BLOMSTRAND | None | No | No | sequence. A simplified linking process, such as a Bayesian method, may be used to match new papers and data elements to existing clusters. Reevaluation process 622 may be performed when author entities not appearing on the author table are added to the database.

Up to this point, the decisions of the DAIS system have been mostly automatic with little manual intervention. But in the case of highly cited author lists with known papers these authors authored, it is likely that once customers start seeing DAIS results they will want to make manual corrections. There are numerous ways to accomplish manual input to edit or add data elements and this is not essential to the invention. One exemplary way to provide manual input 618 is to tag authorships with "manual pseudo author ids". These ids are separate from the real author ids which are automatically derived. When author names undergo reevaluation these "manual pseudo author ids" may be treated as a 100% reliable data element—like email address. So author ids will still be automatically derived but they will use manual input information in making the decision. The DAIS could also tag authorships with, for example, "-M1234" which means that this authorship is not from the author identified by the manual pseudo author id "M1234".

For instance, authors may recognize that not all of their works of authorship are attributed to them or are divided among more than one cluster or author entity by the DAIS and then as presented by and through the WoS or other database. The author may issues a signal, such as by acting on links or buttons provided via a browser, to the CMS or other system. The CMS then receives the request from the author or perhaps a reviewer or administrator indicating that an author is associated with more than one cluster. In this process, the CMS or other system may send to the author or to an administrator a request signal requesting a set of information. The CMS may then receive a response to the request signal and based on the response take some appropriate action. For instance the CMS may associate the response with the author such that the author becomes associated with a single cluster or some reference is then associated with the author's cluster/author identifier or code.

In carrying out the various processes described above, the following routines may be employed. The following are essentially descriptions of things that are described above. They may be referred to from multiple places in the specification. Inclusion here does not mean that library functions exist for doing these, nor is it intended to suggest that such functions are required, but they could be used.

The "Isolate Last Name and Initials" routine assumes starting with an author's name in a particular format, e.g., ISI The "Get Last Name Frequency" is a useful routine to help establish the frequency of occurrence of a particular last name. Use the author's last name and if necessary use the Author Name and Isolate the last name, refer to the Isolate Last Name routine. If the last name is longer than 15 characters, only use the first 15. If it's a corporate name then use "1" as the "Last Name Frequency" otherwise use the Last Name to do a lookup in the DB2 table Lname_Freq_Dict described above. If no rows are found then use "1" as the "Last Name Frequency". If a row is found then use the frequency from the table.

Another routine, the ISI Format Author Name routine converts a source author into ISI format which essentially is all upper case, no punctuation, last name+space+initials. A period may be used instead of a space to indicate that the last name was truncated. If the first character of the author's name is "*" then it's a corporate name and doesn't need to be converted. This routine involves the following system. If the first character of the author's name is "h" then the ISI Format Name is the same as the original Author Name. Don't do anything further. If the Author Name contains a comma "," then everything preceding the comma is considered the last name. Drop any spaces in the last name the comma. Then drop the comma. Drop all hyphens "-" and apostrophes "'". Convert all lower case alphabetic characters to upper case. Table 28 illustrates an example of this routine.

TABLE 28

| Author Name | ISI Format Name |
|---|---|
| MENNESSIER MO | MENNESSIER MO |
| *US DEP TRANSP | *US DEP TRANSP |
| VENKATAKRISHNAB.H | VENKATAKRISHNAB.H |
| KATSELIP.LT | KATSELIP.LT |
| Yang, CH | YANG CH |
| van der Steenhoven, TJ | VANDERSTEENHOVEN TJ |
| Pressick-Kilborn, K | PRESSICKKILBORN K |
| O'Neill, PA | ONEILL PA |
| ADIMURTHI | ADIMURTHI |

The following Table 29 is a list of programs discussed herein and a brief description of purpose.

TABLE 29

| Id | Description |
|---|---|
| DAIS001 | Extract item data from Wos. |
| DAIS002 | Extract ref data from Wos. |
| DAIS003 | Create import files for Cited Primary Author Table |
| DAIS004 | Create import files for Item table |

TABLE 29-continued

| Id | Description |
| --- | --- |
| DAIS005 | Create import file for Authorship table |
| DAIS006 | Create import file for Citing Primary Author table |
| DAIS007 | Extract Data Elements File segments |
| DAIS008 | Create Data Matches File segments |
| DAIS009 | Identify Authors |
| DAIS010 | Assign existing author ids to new authorships |

The following relates to the Identify Authors process 608 and explains the process of clustering authorships to determine distinct authors at the core of the DAIS. The first part of this description relates to the structure of the tables, previously discussed, and fields used in the DAIS Cluster Authorship process. Table 3 represents an Input File, the Data Matches File, having fields that are at fixed byte positions. Character fields are left justified and padded with trailing spaces. Integer fields are right justified and padded with leading zeros. As described above, Tables 4-6 represent Output Files, with Table 4 representing the Author Id File which is used as an import file for the Author_Id table; Table 5 representing the Author Element File, which is used as an import file for the Author_Data table; and Table 6 representing the Evaluation File, which is used as an import file for the Author_Id Reevaluation table. Evaluation Auth Cnt: is an integer field that represents the number of authorships (nodes) for the process block. At the initializing stage, the integer field Post Eval Auth Cnt is set this to zero, the Last Evaluation field is the current timestamp and the Urgency field is set to zero.

The WoS Load File is loaded into a table for the WoS database and contains one record for each record in the Author Id File. The WoS Load File is a comma separated file containing three fields: ut, position and authorid.

As discussed previously, program "DAIS009" makes a pass through the sorted Data Matches File; makes the author identification decisions; assigns the author ids; writes them out to the "Author Id" file and writes out the matching elements to the "Author Element" file. All Data Matches records with the same value for "Last Name+1.sup.st Initial" are grouped together and must be processed together as a logical unit. I'll refer to this unit as a "process block". All Data Matches records with the same value for "Last Name+1.sup.st Initial", "1.sup.st Item UT", "1.sup.st Item Position", "2nd Item UT", and "2nd Item Position" are grouped together and must be processed together as a logical unit. I'll refer to this unit as an "authorship pair block". There will be one to many authorship pair blocks per process block.

The following arrays (e.g., RAM data structures) will keep information for the process block currently being processed. The Authorship Linking Array keeps track of those authorships that have been identified as being by the same author. Each array entry consists of three fixed length fields, as shown in Table 30.

TABLE 30

| Field | Type |
| --- | --- |
| UT | char(15) |
| Position | small int |
| Author Index | small int |

UT and Position together identify authorships. Author Index associates authorships by the same author. All authorships that have been identified as being from the same author will all have as their Author Index the smallest array index value of all the authorships by that author.

TABLE 31

| UT | Position | Auth Idx |
| --- | --- | --- |
| 000212337800013 | 2 | 0 |
| 000125239100123 | 1 | 1 |
| 000157237200419 | 3 | 1 |

In the above example of Table 31, 000125239100123-1 and 000157237200419-3 have been determined to be by the same author so they both have the same value for Author Index and that value is the array index for the 000125239100123-1 entry. The 000212337800013-2 entry hasn't been identified as being by the same author as any other entry so it has its own index value for Author Index.

The Author Element Array holds information needed for the Author Element File represented at Table 32. Author Index is an index value that identifies an entry in the Authorship Linking Array.

TABLE 32

| Field | Type |
| --- | --- |
| Author Index | small int |
| Last Name + 1$^{st}$ Initial | Char(40) |
| Element Type | small int |
| Data | Char(100) |

The Initial Mismatch Array as represented at Table 33, holds authorship pairs that met the criteria for a link but that do not have identical initials. Bad Link is a flag that indicates when a link is considered bad.

TABLE 33

| Field | Type |
| --- | --- |
| 1$^{st}$ Item UT | Char(15) |
| 1$^{st}$ Item Position | Integer |
| 1$^{st}$ Item Full Inits. | Char(4) |
| 2$^{nd}$ Item UT | Char(15) |
| 2$^{nd}$ Item Position | Integer |
| 2$^{nd}$ Item Full Inits. | Char(4) |
| Bad Link | Small Int. |

The Link Bridge Array, as represented at Table 34, holds information from the Initial Mismatch Array. Link Index is an index value that identifies an entry in the Initial Mismatch Array.

TABLE 34

| Field | Type |
| --- | --- |
| Link Index | Small Int. |
| Cluster Number | Integer |
| Full Inits. | Char(4) |

With reference to FIG. 3, and DAIS Cluster Authorship Process 300, the following section describes how the DAIS uses and processes the blocks and pieces of information to form clusters. The multi-step Per Process Block 302, iteration is performed once for unique value for "Last Name+1.sup.st Initial" in the Data Matches File. At the start of each iteration, the two arrays should be "empty". This may simply mean setting a value that keeps track of the number of occurrences to zero (or −1) for each array.

Nested within Per Process Block 302, the multi-step Per Authorship Pair Block 304 iteration is performed once for each unique combination of values for "Last Name+1st Initial", "1st Item UT", "1st Item Position", "2nd Item UT", and "2nd Item Position" in the Data Matches File. At the start of each iteration the index of the last entry is noted in the Author Element Array. The "1st Item UT" and "1st Item Position" values are used for the current authorship pair block to search for the authorship in the Authorship Linking Array, which if found its Author Index value is noted. If not found it is added to the end of the array setting its Author Index value to the entry's index. The "2nd Item UT" and "2nd Item Position" values are used for the current authorship pair block to search for the authorship in the Authorship Linking Array. If found its Author Index value is noted. If not found it is added to the end of the array setting its Author Index value to the entry's index. The smaller of the two Author Index values is noted and referred to "Smaller Author Index" and the larger of the two Author Index values is noted and referred to as "Larger Author Index".

Within the Per Authorship Block process 304 is Tally Element Counts process 306 in which all the Data Matches File records for the current authorship pair block are read and counts per element type are tallied. All records where the two authorships have the same ut value are ignored or skipped over. Once the program has finished tallying values for the current authorship pair block, values for parameters identified by the letters A thru I will be ascertained as follows.

For each Data Matches File record for the current authorship pair block an entry is added to the end of the Author Element Array. For "Author Index" use the "Smaller Author Index" value as previously determined.

Parameter A is the count of matching co-authors. This is a count of Data Matches File records for the current authorship pair block that have an Element Type count with the value 1. If A has a value of zero, then B thru D also have values of zero. The DAIS009 program may simply set them to 0 and avoid wasting processing resources calculating them. Parameter B=A/Z where Z is the number of secondary authors, i.e., any co-authors other than the primary author, for the paper with fewer secondary authors. Use the "1st # of Auths" and "2nd # of Auths" values from any Data Matches File record for the current authorship pair block. The simple routine may be expressed as follows:

IF "$1^{st}$ # of Auths" > "$2^{nd}$ # of Auths"
    Z = "$2^{nd}$ # of Auths" −1
ELSE
    Z = "$1^{st}$# of Auths" −1

Parameter C=A/Y where Y is the combined number of secondary authors for the two papers. Use the "1.sup.st# of Auths" and "2.sup.nd # of Auths" values from any Data Matches File record for the current authorship pair block. The simple routine may be expressed as follows.

$Y = "1^{st}$ # of Auths"$+"2^{nd}$ # of Auths"$-2$

Parameter D=A/X where X is the sum of all matching secondary authors' frequencies. X is the summation of "Auth Frequency" values of all Data Matches File records for the current authorship pair block that have an Element Type count with the value 1. Parameter E is the count of matching cited person authors plus one. The Tally Element Count process 306 calculates the count of Data Matches File records for the current authorship pair block that have an Element Type count with the value 2 and the Data field doesn't start with "*". Then add 1 to this count to get E. If E has a value of 1 then parameters F through H will not be used. The DAIS009 program sets parameters F through H to have a value of zero and need not calculate them. Parameter F=E/W where W is one greater than the number of cited person authors for the paper with fewer cited person authors. Use the "1.sup.st # of Pers Auth Citns" and "2.sup.nd # of Pers Auth Citns" values from any Data Matches File record for the current authorship pair block. The routine may be expressed as follows:

IF "1st # of Pers Auth Citns" > "$2^{nd}$ # of Pers Auth Citns"
    W = "$2^{nd}$ # of Pers Auth Citns" +1
ELSE
    W = "1st # of Pers Auth Citns" +1

Parameter G=E/V where V is two greater than the combined number of cited person authors for the two papers, which may be expressed as:

$V = "1^{st}$ # of Pers Auth Citns"$+"2^{nd}$ # of Pers Auth Citns"$+2$

Parameter H=E/U where U is one greater than the sum of all matching cited authors' frequencies. U is one greater than the summation of "Auth Frequency" values of all Data Matches File records for the current authorship pair block that have an Element Type count with the value 2 and the Data field doesn't start with "*". Parameter I is one greater than the count of matching cited corporate authors. DAIS009 calculates the count of Data Matches File records for the current authorship pair block that have an Element Type count with the value 2 and the Data field starts with "*" DAIS009 then adds 1 to this count to get I. Parameter J is the count of matching citing authors. DAIS009 calculates the count of Data Matches File records for the current authorship pair block that have an Element Type count with the value 3. K is the count of matching email address. Calculate the count of Data Matches File records for the current authorship pair block that have an Element Type count with the value 4.

Within the Per Authorship Block process 304 is Apply Rules process 308. As an initial matter, DAIS009, before applying the rules, should first check to see if the "Full Initials" for the two authorships are compatible. From the Data Matches File, DAIS009 uses "1.sup.st Item Full Initials" and "2.sup.nd Item Full Initials" and uses the Full Initials routine described below to determine if the initials are compatible. If the initials are not compatible then the authorship pair does not "pass", and there is no need to test the rules below. If the initials are compatible then proceed to test the following rules. The rules in Apply Rules process 308 use "Tally Element Count" values A thru K to determine if the two authorships of the "authorship pair block" are from the same author. If any one of these rules pass then the process assumes that the two authorships are from the same author and it isn't necessary to check the remaining rules. If all rules fail then the process does not assume that the authorships are from the same author. Further processing to separately establish a link, such as by using Bayesian rules, may be used to supplement these rules.

The following rules use natural logarithms "lnX" and its inverse operation eX. The notation for the C functions are in "math.h" format. They are log(X) and exp(X). These rules consist of an expression and a threshold. In this exemplary configuration, the expression value exceeds the threshold value then the rule passes and the two authorships are assumed to be from the same author. Rule R01 requires "co-author" matches so if A=0, then the DAIS009 program does not test this rule, and assumes it fails. Rule R01 may be expressed as follows:

$$\text{Expression}=3.3*\log(A)+0.6*\log(B)+7.9*\log(C)+0.4*\log(D)$$

Threshold=−9.81

Rule R02 requires "co-author" matches so if A=0, then the DAIS009 program does not test this rule, and assumes it fails. Rule R02 may be expressed:

$$\text{Expression}=8.9*\log(A)+4*\log(B)+1.3*\log(D)$$

Threshold=−3.24

Rule R03 requires "co-author" matches so if A=0, then DAIS009 program does not test this rule, and assumes it fails. Rule R03 may be expressed as:

$$\text{Expression}=3.7*\log(A)+0.6*\log(C)+0.5*\log(D)$$

Threshold=−1.117

Rule R04 requires "co-author" matches so if A=0, then DAIS009 program does not test this rule, and assumes it fails. Rule R04 may be expressed as:

$$\text{Expression}=9.4*\log(A)+3.7*\log(B)+1.5*\log(D)$$

Threshold=−4.063

Rule R05 requires "co-author" matches so if A=0, then DAIS009 program does not test this rule, and assumes it fails. Rule R05 may be expressed as:

$$\text{Expression}=2*\log(A)+0.3*\log(B)+0.4*\log(C)$$

Threshold=0.7

Rule R06 requires "co-author" matches so if A=0, then DAIS009 program does not test this rule, and assumes it fails. Rule R06 may be expressed as:

$$\text{Expression}=4*\log(A)+0.8*\log(B)+8.3*\log(C)$$

Threshold=−16.75

Rule R07 requires "co-author" matches so if A=0, then DAIS009 program does not test this rule, and assumes it fails. Rule R07 may be expressed as:

$$\text{Expression}=0.6*\log(A)+4.9*\log(C)+\log(D)$$

Threshold=−14.983

Rule R08 requires "co-author" matches so if A=0, then DAIS009 program does not test this rule, and assumes it fails. Rule R08 may be expressed as:

$$\text{Expression}=4*\log(A)+1.4*\log(B)$$

Threshold=0.7

Rule R09 requires "co-author" matches so if A=0, then DAIS009 program does not test this rule, and assumes it fails. Rule R09 may be expressed as:

$$\text{Expression}=\log(A)+\log(C)$$

Threshold=−1.7

Rule R10 requires "cited author" matches so if E=1 and I=1, then DAIS009 program does not test this rule, and assumes it fails. Rule R10 may be expressed as:

$$\text{Expression}=3.9*\log(E)+2.3*\log(F)+2.3*\log(G)+0.5*\log(H)+0.3*\log(1)$$

Threshold=−1.522

Rule R11 requires "cited author" matches so if E=1 and I=1, then DAIS009 program does not test this rule, and assumes it fails. Rule R11 may be expressed as:

$$\text{Expression}=4*\log(E)+11*\log(F)$$

Threshold=4.2

Rule R12 requires "cited author" matches so if E=1 and I=1, then DAIS009 program does not test this rule, and assumes it fails. Rule R12 may be expressed as:

$$\text{Expression}=4.2*\log(E)+4*\log(F)+0.6*\log(G)+0.2*\log(H)+1.1*\log(1)$$

Threshold=1.95

Rule R13 requires both "co-author" and "cited author" matches so if A=0 or (E=1 and I=1), then DAIS009 program does not test this rule, and assumes it fails. Rule R13 may be expressed as:

$$\text{Expression}=\log(\exp(14.4*\log(A)+0.6*\log(B)+7.9*\log(C)+0.4*\log(D)+16.33)+\exp(3.9*\log(E)+2.3*\log(F)+2.3*\log(G)+0.5*\log(H)+3.86)+\exp(-2.3)*I)$$

Threshold=−1.515

Rule R14 requires both "co-author" and "cited author" matches so if A=0 or (E=1 and I=1), then DAIS009 program does not test this rule, and assumes it fails. Rule R14 may be expressed as:

$$\text{Expression}=\log(\exp(10.4*\log(A)+0.1*\log(B)+4*\log(D)+16)+\exp(1.9*\log(E)+1.9*\log(E)+1.9*\log(F)+0.4*\log(H)+0.72)+\exp(-1.5)*I)$$

Threshold=−0.6178

Rule R15 requires both "co-author" and "cited author" matches so if A=0 or (E=1 and I=1), then DAIS009 program does not test this rule, and assumes it fails. Rule R15 may be expressed as:

$$\text{Expression}=\log(\exp(\log(A)+0.7*\log(D)+11.4)+\exp(1.3*\log(F)+4*\log(G)+0.1*\log(H)+20.78)+\exp(6.83)*I)$$

Threshold=8.6286

Rule R16 requires both "co-author" and "cited author" matches so if A=0 or (E=1 and I=1), then DAIS009 program does not test this rule, and assumes it fails. Rule R16 may be expressed as:

$$\text{Expression}=\log(\exp(2*\log(E)+2.1*\log(G)+20)+\exp(9.27)*I)$$

Threshold=13.3

Rule R17 is simply expressed as:

$$\text{Expression}=J$$

Threshold=0.5

Rule R18 is simply expressed as:

$$\text{Expression}=K$$

Threshold=0.5

Within the Pre Authorship Pair Block 304 is Fix Author Indexes process 310. When DAIS009 program determines that the two authorships of the current Authorship Pair Block are from the same author, the Fix Author Indexes process 310 links them together by assigning each of them the same value for "Author Index" in both the Authorship Linking Array and the Author Element Array. Because one or both of these two authorships may have already been linked with other authorships, the DAIS009 looks beyond just these two authorships and makes a complete pass through both arrays checking their "Author Index" values. Upon seeing the value "Larger Author Index," it is replaced it with the value "Smaller Author Index".

Within the Pre Authorship Pair Block 304 is Buffer Link process 312 is used as follows. Although they passed the rules, it has not yet been decided if the two authorships of the current Authorship Pair Block are from the same author because their initials are not identical. The decision will be based on whether or not the link will cause authorships with conflicting initials to be grouped in the same cluster. This cannot be determined until the clustering is complete. So the current pair or "link" must be buffered in the Initial Mismatch Array until clustering is done. All of the fields come from the Data Matches File record except Bad Link. In this exemplary configuration, Bad Link should always be given the value 0.

Within the Pre Authorship Pair Block 304 is Flush Author Element Array process 314 is used as follows. The information for the current Authorship Pair Block was insufficient to make the conclusion that the two authorships are from the same author. For this reason we must flush that information from the Author Element Array. In process 5.2 just before we started processing the information for this Authorship Pair Block the DAIS009 program noted the index of the last entry in the Author Element Array. It now must set it back to that point so that all entries added since then will be ignored. After completing the Per Authorship Pair Block process 304, the Per Process Block process 302 includes a Tag Bad Links process 316, which is referenced in FIG. 4 generally by the reference number 400 and is more particularly described in FIG. 4. Tag Bad Links process 316/400 includes the following sub-processes.

The Load Link Bridges sub-process 402 makes a pass through the Initial Mismatch Array. For each entry (row) two entries are inserted into the Link Bridge Array. The first entry will have the cluster number for the 1st item and the full initials from the 2nd item. The second entry will have the cluster number for the 2nd item and the full initials from the 1st item. Both entries will have the same Link Index value. In this sub-process, the Link Index is an index or pointer to the entry of the Initial Mismatch Array from which the entry was created. The cluster number using the UT and Position to perform a lookup in the Authorship Linking Array. The Author Index is the cluster number. The full initials comes from the Initial Mismatch Array entry.

Next, the Link Bridge Array is sorted by cluster number in the Sort Link Bridges subprocess 404. In the Identify Bad Links sub-process 406, a pass is made through the sorted Link Bridge Array and each occurrence (row) is compared to all other occurrences with the same cluster number. If the initials are incompatible, the system uses the link indexes for both occurrences to go back to the Initial Mismatch Array and mark both initial mismatch occurrences as bad by setting their Bad Link flags to 1. Finally a Per Good Link sub-process 408 is performed to fix author indexes by making a pass through the Initial Mismatch Array by skipping over occurrences where Bad Link equals 1. The remaining good links are processed just like links where the initials were identical.

The per Process Block process 302 of FIG. 3 includes an Assign Author Ids and Write Output process 318, which works as follows. For every unique "Author Index" value in the Authorship Linking Array the system generates and assigns a new Author Id. The Author_Id_Control table is used to get the last author id; and one is added for each new Author_Id and the table is updated. This program runs against itself so it is important that the row is locked while it is being used and freed as soon as it has been updated. For each entry in the Authorship Linkage Array, the process 318 writes out a record to the Author Id File. Authorid is the newly assigned Author_Id. Authseq is Position. Use the UT and routine 6.1 to get the issueno and itemno. For each entry in the Author Element Array, the process 318 writes out a record to the Author Element File. The authorid is the Author_Id that was assigned the entry's "Author Index" value. For the Process Block, a single record is written to the Evaluation File. The "Evaluation Auth Cnt" is the total number of entries in the Authorship Linking Array. "Post Eval Auth Cnt" and Urgency should both be set to 0. "Last Evaluation" may be set to a pre-defined default value.

The following is a description of the Full Initials Compatibility routine as used herein. Initials are a string of alphabetic characters. In comparing two sets of initials, e.g., 1st Item Full Inits and 2nd Item Full Inits, DAIS009 determines that the sets of initials are compatible if the shorter character string matches the start of the longer string. If the strings are the same length then the entire strings must match. Table 35 provides examples of initial character strings with resulting compatibility results to illustrate this point.

TABLE 35

| $1^{st}$ Item Full Inits | $2^{nd}$ Item Full Inits | Compatible? |
|---|---|---|
| WA | W | Yes |
| WA | WB | No |
| W | WAB | Yes |
| WA | WBA | No |

The DAIS may combine the known extraction, sorting and linking techniques or database management techniques, as described above, with the inventive clustering and linking techniques described herein to provide an improved and highly accurate research database and tools. For instance the DAIS can establish an author biography page and associated bibliography for that particular author using the invention as described herein. Each author is associated with a single cluster and cluster/author entity code or identifier. Once DAIS has been applied across the database(s) of papers, writings, and other publication and citations, and once clustering and author identifier codes have been established, author bibliographies, for example, will include those authorships the DAIS linked or associated with each respective author. Also, papers associated with each authorship may be linked so that a researcher may easily navigate a research tool integrated with an DAIS processed research database to quickly access, such as through hypertext links, papers or other publications displayed to the user as being linked via an author bibliography or other display.

For example, the extraction sorting and linking process may include an extraction module for identifying excerpts or portions of electronic documents that contain information or data of interest, such as author name, author email address, author institution, co-author information, and other citation information. The extraction module may then parse the excerpted information to distribute the information of interest within assigned fields such as for records in a database. This information may be then used to compare the information against known information in database records or against fields in a table or against corresponding fields associated with another paper. A matching module matches extracted information with existing records such as with cluster identifier code or author identifier code. An inserting module may be used to insert hypertext links within bibliographical records or biography records or cluster identifier associated records. A loading module may be included to manage loading of bibliographical and biographical records into one or more relational databases for storage and further management and for retrieval and analysis. The matching module may include Bayesian or other linking algorithms or rules on which matches or links are based. The module, for instance, may select an author or cluster identifier code or record with a particular paper based on its excerpted information or based on citation information.

FIGS. 7 through 17 are screen shots illustrating how information previously disambiguated using the processes discussed herein may be presented to users such as users 524 and 620 of FIGS. 5 and 6 respectively. In this exemplary embodiment, the research tool and information is presented to a user via the TS WoK system and graphical user interface. FIG. 7 represents an initial search screen from which a user may select database(s) of interest, may input search request information and may limit the search or results based on some criteria, e.g., date of publication range or cutoff. As shown, a user inputs an author name to be searched—"Smith JA." In addition to or in lieu of the author name, a user could search using the "topic" field. In this manner the user could limit the author name search to only those author entities having associated with it the topic of interest. The user could also generate a full set of authorships associated with a given topic.

Figures 9, 10:
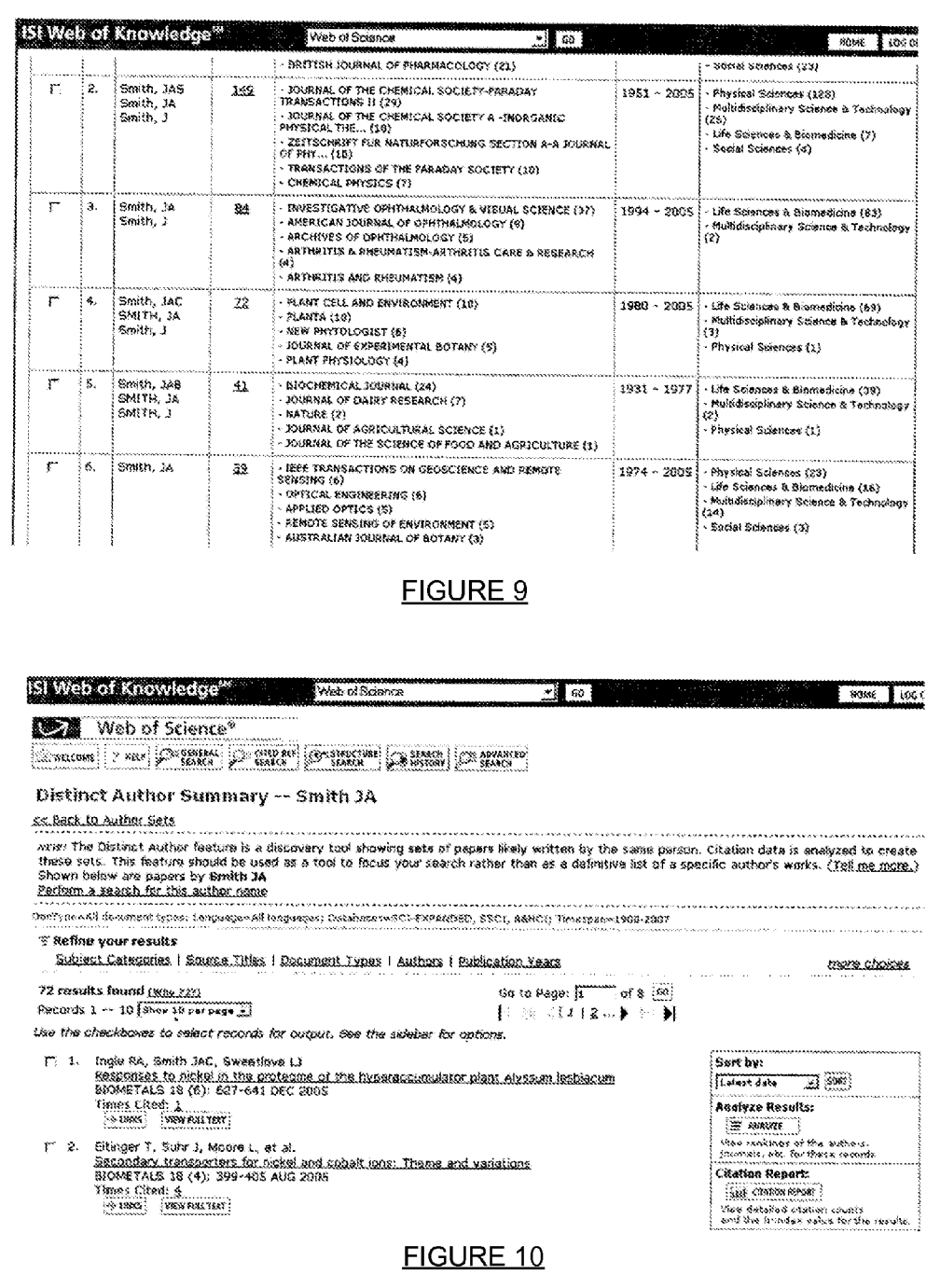

After launching the author name search for "Smith JA", the WoK presents the user, as shown in FIG. 8, a screen with the results of the search. In this case the results show the number of resulting papers found in the database that have matching author name data (2,711). From the "View Author Sets for Smith JA" link, the user can link directly to a listing of author sets (author entities or cluster entities) that match the name data "Smith JA." Each author set represents a cluster entity that has associated with it a unique code. Each of these unique clusters has associated with it an author name field that matches the search for "Smith JA." FIG. 9 illustrates how the "Author Sets" for the search are presented to the user. The information presented may include a variety of links to make for a very effective tool for the user, for instance subject codes from meta data in the results may provide a direct link to related items. Next, a user selects, for example, from the author set listing the author set and row marked "4" "SMITH JA", showing 72 papers linked to that entity. FIG. 10 represents a "Distinct Author Summary" page presented to the user relating to the selected author set 4. From this page the user may browse among the 72 resulting items associated or linked with this author entity—author set 4. The user may select one of the papers.

Figure 13:
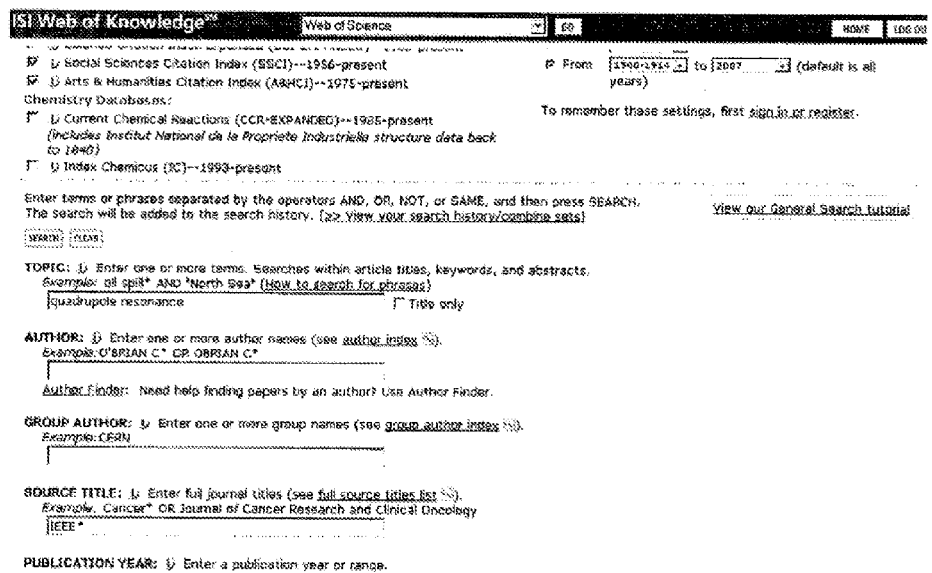
FIG. 13 is a screen shot illustrating a graphical user interface by which a user may access information disambiguated using the author disambiguation linking techniques associated with the present invention.
Figure 14:
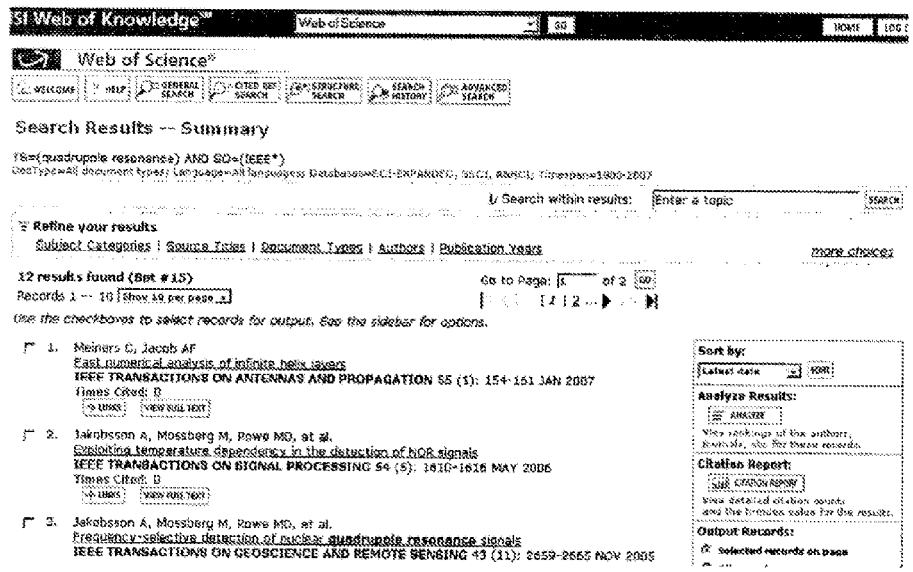
FIG. 14 is a screen shot illustrating a graphical user interface by which a user may access information disambiguated using the author disambiguation linking techniques associated with the present invention.

As shown in FIG. 11 record 1 of 72 has been selected and is presented to the user for further consideration. FIG. 12 illustrates a user selecting the "cited references" link on the screen of FIG. 11. FIG. 13 shows the bottom portion of the screen of FIG. 7 with the additional field "source title" shown and having input in that field "IEEE*" for searching based on source title and the additional limitation "quadruple resonance" input in the "topic" filed. FIG. 14 then shows the 12 results yielded from the database for this search. FIG. 15 then presents the Item #2. ("Record 1 of 12"), as selected from the list presented on the screen of FIG. 14. As shown on the results screen of FIG. 15, an authorship identified with the author name "Smith JAS" is included in the full record of Item #2. A user may select on the active link "Smith JAS" to generate the search results summary screen of FIG. 16 for the author set associated with this particular cluster entity. In addition, the user may from the screen of FIG. 16 then select on the "View Author Sets for Smith JAS" to then link to a "Distinct Author Sets—Smith JAS" screen showing the five author sets associated with the author name "Sith JAS." As described with reference to FIGS. 7-17, there are a number of linking techniques that allow a user to exploit the disambiguated data to assist in research and scientific endeavors.

The present invention is not to be limited in scope by the specific embodiments described herein, It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

What is claimed is:

1. A computer-implemented method comprising:
   a. receiving by a computer a set of electronic information associated with a set of publications, each publication in the set of publications comprising at least one cited reference to an other publication and having at least one authorship relating to the other publication;
   b. comparing by a computer at least a portion of the set of electronic information with authorship data contained in an authority database, the authorship data related to authorship entities represented in the authority database;
   c. linking the at least one authorship to the one or more authorship entities based on determining an authorship similarity between the at least one authorship and the one or more authorship entities; and
   d. associating by a computer the set of electronic information with one or more authorship entities having been previously defined at least in part using a disambiguation process and previously stored in the authority database, wherein the set of electronic information is received subsequent to the disambiguation and storing process, the at least one authorship being linked to a previously defined cluster of authorships.

2. The method of claim 1, wherein each authorship entity is associated with a cluster of authorships and further comprising:
   adding the at least one authorship to the authority database and to at least one cluster of authorships.

3. The method of claim 1 further comprising:
   receiving a manual input confirming the linking of the at least one authorship with the previously defined cluster of authorships.

4. The method of claim 1 further comprising:
   receiving a manual input for confirming an association of an authorship with an authorship entity.

5. The method of claim 1, wherein associating includes:
   receiving a manual input concerning associating the set of electronic information with the one or more authorship entities.

6. The method of claim 1 further comprising:
   sending an electronic communication to an email address associated with an authorship entity.

7. The method of claim 6, wherein the electronic communication includes a link to enable inputting of a signal confirming an association of an authorship with an authorship entity stored in the authority database.

8. The method of claim 6, wherein the electronic communication indicates a potential match of an authorship with an authorship entity stored in the authority database.

9. The method of claim 1 further comprising:
upon associating, storing the set of electronic information in the authority database.

10. The method of claim 1 further comprising:
receiving a query related to the one or more authorship entities; and
presenting authorship data in response to the query.

11. The method of claim 10 further comprising:
in response to presenting, receiving a signal confirming author entity data stored at the authority database.

12. The method of claim 10 further comprising:
maintaining an author profile record associated with a unique author identifier and a cluster of authorships associated with the unique author identifier, the author profile being stored at the authority database.

13. The method of claim 1 further comprising:
providing a secure account for electronically accessing data associated with a unique author identifier;
upon secure account access, presenting author entity data associated with the unique author identifier stored at the authority database in response to receiving a request for information.

14. The method of claim 13 further comprising:
linking at least one additional authorship to an existing cluster of authorships associated with the unique author identifier in response to a received input associated with the unique author identifier; and
storing data representing the linking in an authority database of authors.

15. The method of claim 14, wherein the authority database of authors includes a plurality of unique author entity records each associated with a unique actual author and a cluster.

16. A computer-based system comprising:
a computer having a processor and a memory and adapted to process a set of electronic information associated with a set of publications, each publication in the set of publications comprising at least one cited reference to an other publication and having at least one authorship related to the other publication;
software stored in the memory and when executed by the processor adapted to:
a. receive a set of electronic information associated with a set of publications;
b. compare at least a portion of the set of electronic information with authorship data contained in an authority database, the authorship data related to authorship entities represented in the authority database;
c. link the at least one authorship to the one or more authorship entities based on determining an authorship similarity between the at least one authorship and the one or more authorship entities; and
d. associate the set of electronic information with one or more authorship entities having been previously defined at least in part using a disambiguation process and previously stored in the authority database, wherein the set of electronic information is received subsequent to the disambiguation and storing process, the at least one authorship being linked to a previously defined cluster of authorships.

17. The system of claim 16, wherein each authorship entity is associated with a cluster of authorships and wherein the software is further adapted to:
add the at least one authorship to the authority database and to at least one cluster of authorships.

18. The system of claim 16, wherein the software is further adapted to:
receive a manual input confirming the linking of the at least one authorship with the previously defined cluster of authorships.

19. The system of claim 16, wherein the software is further adapted to:
receive a manual input for confirming an association of an authorship with an authorship entity.

20. The system of claim 16, wherein the software is further adapted to:
receive a manual input concerning associating the set of electronic information with the one or more authorship entities.

21. The system of claim 16, wherein the software is further adapted to:
send an electronic communication to an email address associated with an authorship entity.

22. The system of claim 21, wherein the electronic communication includes a link to enable inputting of a signal confirming an association of an authorship with an authorship entity stored in the authority database.

23. The system of claim 21, wherein the electronic communication indicates a potential match of an authorship with an authorship entity stored in the authority database.

24. The method of claim 16, wherein the software is further adapted to:
store the set of electronic information in the authority database.

25. The system of claim 16, wherein the software is further adapted to:
receive a query related to the one or more authorship entities; and
present authorship data in response to the query.

26. The system of claim 25, wherein the software is further adapted to:
receive a signal confirming author entity data stored at the authority database.

27. The system of claim 25, wherein the software is further adapted to:
maintain an author profile record associated with a unique author identifier and a cluster of authorships associated with the unique author identifier, the author profile being stored at the authority database.

28. The system of claim 16, wherein the software is further adapted to:
provide a secure account for electronically accessing data associated with a unique author identifier;
confirm secure account access and present author entity data associated with the unique author identifier stored at the authority database in response to receiving a request for information.

29. The system of claim 28, wherein the software is further adapted to:
link at least one additional authorship to an existing cluster of authorships associated with the unique author identifier in response to a received input associated with the unique author identifier; and
store data representing the linking in an authority database of authors.

30. The system of claim 29, wherein the authority database of authors includes a plurality of unique author entity records each associated with a unique actual author and a cluster.

* * * * *